(12) United States Patent
Li et al.

(10) Patent No.: US 9,970,161 B2
(45) Date of Patent: May 15, 2018

(54) RAIL VIBRATION ABSORBER

(71) Applicants: QINGDAO CREATE ENVIRONMENT CONTROL TECHNOLOGY CO., LTD., Shandong (CN); THE THIRD RAILWAY SURVEY AND DESIGN INSTITUTE GROUP CORPORATION, Tianjin (CN)

(72) Inventors: Hong Li, Tianjin (CN); Xuejun Yin, Shandong (CN); Haifu Sun, Tianjin (CN); Xiangfei Kong, Shandong (CN); Li Guo, Tianjin (CN); Hongxiao Qu, Shandong (CN); Peng Xu, Tianjin (CN); Xuezhi Fu, Shandong (CN)

(73) Assignees: QINGDAO CREATE ENVIRONMENT CONTROL TECHNOLOGY CO., LTD., Shandong (CN); THE THIRD RAILWAY SURVEY AND DESIGN INSTITUTE GROUP CORPORATION, Tianjin (CN)

( * ) Notice: Subject to any disclaimer, the term of this patent is extended or adjusted under 35 U.S.C. 154(b) by 172 days.

(21) Appl. No.: 14/903,451

(22) PCT Filed: Jul. 10, 2014

(86) PCT No.: PCT/CN2014/081929
§ 371 (c)(1),
(2) Date: Jan. 7, 2016

(87) PCT Pub. No.: WO2015/003634
PCT Pub. Date: Jan. 15, 2015

(65) Prior Publication Data
US 2016/0298300 A1 Oct. 13, 2016

(30) Foreign Application Priority Data

Jul. 10, 2013 (CN) .......................... 2013 1 0287329

(51) Int. Cl.
*E01B 19/00* (2006.01)
*E01B 5/02* (2006.01)
*F16F 7/108* (2006.01)

(52) U.S. Cl.
CPC ................ *E01B 19/00* (2013.01); *E01B 5/02* (2013.01); *E01B 19/003* (2013.01); *F16F 7/108* (2013.01)

(58) Field of Classification Search
CPC ...... E01B 19/00; E01B 19/003; E01B 19/006; E01B 5/02; E01B 9/62; E01B 9/68
See application file for complete search history.

(56) References Cited

U.S. PATENT DOCUMENTS

| | | | | |
|---|---|---|---|---|
| 5,165,598 A | * | 11/1992 | Ortwein | E01B 5/02 238/283 |
| 6,402,044 B1 | * | 6/2002 | Sato | E01B 5/08 238/382 |

(Continued)

FOREIGN PATENT DOCUMENTS

| CN | 1774543 | 5/2006 |
|---|---|---|
| CN | 1774543 A | 5/2006 |

(Continued)

OTHER PUBLICATIONS

International Search Report prepared by the State Intellectual Property Office of the P.R. China dated Sep. 2, 2014, for International Application No. PCT/CN2014/081929.

(Continued)

*Primary Examiner* — Jason C Smith
(74) *Attorney, Agent, or Firm* — Sheridan Ross PC

(57) ABSTRACT

Disclosed is a rail vibration absorber, comprising an elastic element (4), a mass (3) and at least one coupling frame (2).

(Continued)

The coupling frame (2) has the same surface shape as a non-working surface coupling portion of a steel rail. The coupling frame (2) comprises at least one vibration absorption cavity (100). The mass (3) is at least partially disposed in the vibration absorption cavity (100) of the coupling frame (2). The elastic element (4) is arranged between the mass (3) and a wall of the vibration absorption cavity (100). The rail vibration absorber has a simple structure, stable performance and good weatherability, and can effectively slow wear to the steel rail and prolong the service life thereof.

14 Claims, 13 Drawing Sheets

(56) References Cited

U.S. PATENT DOCUMENTS

| | | | | |
|---|---|---|---|---|
| 8,985,476 | B1* | 3/2015 | O'Connell | E01B 19/00 238/8 |
| 2007/0290061 | A1* | 12/2007 | Sears | E01B 19/00 238/150 |
| 2015/0345083 | A1* | 12/2015 | Veit | E01B 19/003 238/351 |
| 2016/0053440 | A1* | 2/2016 | Ernstad | E01B 26/005 238/140 |
| 2016/0298300 | A1* | 10/2016 | Li | E01B 19/003 |

FOREIGN PATENT DOCUMENTS

| | | |
|---|---|---|
| CN | 1928235 | 3/2007 |
| CN | 1928235 A | 3/2007 |
| CN | 101368356 | 2/2009 |
| CN | 101368356 A | 2/2009 |
| CN | 101372823 | 2/2009 |
| CN | 201396393 | 2/2010 |
| CN | 201396393 Y | 2/2010 |
| CN | 101849068 | 9/2010 |
| CN | 101849068 A | 9/2010 |
| CN | 201722566 | 1/2011 |
| CN | 201722566 U | 1/2011 |
| CN | 103343496 | 10/2013 |
| CN | 103343496 A | 10/2013 |
| CN | 203346739 | 12/2013 |
| CN | 203348739 U | 12/2013 |
| DE | 3631492 | 3/1988 |
| DE | 3631492 A1 | 3/1988 |
| EP | 1608814 | 7/2008 |
| EP | 2415933 A1 | 2/2012 |
| JP | 4921833 | 4/2012 |
| JP | 4921833 B2 | 4/2012 |
| JP | 5156209 | 3/2013 |
| JP | 5158209 B2 | 3/2013 |
| WO | WO 2013058082 A1 | 4/2013 |

OTHER PUBLICATIONS

Extended Search Report for European Patent Application No. 14822882.8, dated Mar. 24, 2017, 10 pages.

Official Action with English Translation for China Patent Application No. 201310287329.6, dated Sep. 16, 2014, 7 pages.

Official Action with English Translation for China Patent Application No. 201310287329.6, dated Jun. 3, 2015, 10 pages.

* cited by examiner

RAIL VIBRATION ABSORBER

CROSS REFERENCE TO RELATED APPLICATIONS

This application is a national stage application under 35 U.S.C. 371 and claims the benefit of PCT Application No. PCT/CN2014/081929 having an international filing date of Jul. 10, 2014, which designated the United States, which PCT application claims the benefit of Chinese Application No. 201310287329.6, filed Jul. 10, 2013, the disclosure of each of which are incorporated by reference herein.

TECHNICAL FIELD

This invention relates to the field of vibration and noise control of rail transit, particularly to a vibration attenuating device disposed on a non-working surface of a steel rail to reduce vibration and noise forcedly generated by the steel rail during running of rail vehicles.

BACKGROUND

In recent years, rail transit in China has been developed rapidly. It provides people a fast and reliable way to travel. However, a problem of vibration and noise generated by the rail transit seriously affects life quality of surrounding residents, and endangers safety of surrounding buildings, and has an impact on the stability, safety and service life of rail.

Researches show that in noise generated by operating of trains, wheel-rail noise accounts for a significant proportion, in which mid-frequency and high-frequency noise radiated by vibration of steel rails contributes a considerable portion to finally overall noise. For this reason, vibration and noise management of steel rails is of great significance to vibration and noise reducing for urban rail transit. In order to control the vibration and noise of the steel rail, engineers have developed a variety of vibration and noise attenuating products, among which a tuned vibration damper is a common one. The tuned vibration damper, as a tuned vibration damper disclosed in Patent Application No. 200480019707.1, utilizes a tuned device consisting of a mass-spring system to generate work by applying a reactive force to dissipate energy when the steel rails vibrates so as to reduce vibration of the rails. This kind of product can obtain reducing vibration and noise to some extent. Nevertheless, it can be found from engineering application that for an elastic element made of elastic materials, such as rubber, and a internal mass block then disposed in the elastic element are commonly used in existing such technical solutions, physical properties of the elastic materials, such as rubber are susceptible to ambient environment and easily scratched so as to be damaged by external objects after exposure to ambient environment for a long time, which in turn adversely affects vibration and noise reduction performance and service life of the tuned vibration damper, because rail transit spreads widely in various regions where ambient environment conditions are dramatically different. Moreover, since that restraining force imparted to the mass block by the elastic element of rubber kind is less, and that the mass block produces a large pull and push component and a small shear component to the elastic element when the mass block moves within the elastic element, shear energy dissipating cannot be effectively realized and hence vibration attenuating effect is limited. Also, due to structure and material limitations, applicable frequency range of this kind of the tuned vibration damper for rails is relatively narrow. For example, for low frequency control, high elasticity is required for an elastomer, but it makes the elastomer soft and prone to being torn; for high frequency control, high rigidity is required for an elastomer, but it makes the elastomer to have a low elasticity and poor vibration attenuating effect. Furthermore, this kind of tuned vibration damper for rail holds following drawbacks: (1) it is difficult to realize accurate mass turned vibration attenuating in two directions simultaneously since the mass blocks are embedded within the elastic material; (2) for it is impossible to directly measure or tune working frequency, the tuned vibration damper is semi-finished product when being sold and is not matched with the steel rail; (3) once the material breaks, a crack will be formed inside and rigidity of the elastic element and working frequency of the tuned vibration damper will be changed; (4) all parameters cannot be optimized when the elastic element, the elastic material and adhesive material are assembled together; (5) once the elastic material breaks, TMD mass block would fall off, which brings trains hidden safety problems.

To summarize, existing tuned vibration dampers have drawbacks such as limited vibration and noise attenuating effects, unstable properties, narrowly applicable frequency ranges and short service life.

SUMMARY

This invention seeks to solve aforementioned drawbacks and to provide a rail vibration absorber with good vibration and noise reducing effect, improved weatherability, stable performance, a wide range of applicable frequency, safety and long service life.

A technical solution in this invention is that a rail vibration absorber, comprising an elastic element(s) and a mass block, wherein rail vibration absorber further comprises at least one coupling frame, the coupling frame has same surface shape as a non-working surface coupling portion of a steel rail, and includes at least one vibration absorption cavity in it, with the mass block at least partially disposed in the vibration absorption cavity of the coupling frame, and the elastic element(s) arranged between the mass block and a wall of the vibration absorption cavity.

Preferably, the elastic element(s) is/are arranged between the mass block and a wall of the vibration absorption cavity in a vertical direction and/or a transverse direction of the steel rail, or the elastic element(s) surround(s) the mass block between the mass block and the wall of the vibration absorption cavity.

The elastic element(s) is/are made of at least one material selecting from a group consisting of rubber, elastic polyurethane and metallic spring, which includes disk spring, plate spring and coil spring and so on. Rubber may be chloroprenerubber, nitrile butadiene rubber, etc. In order to guarantee consistently and effectively elastic support to the mass block by the elastic element(s) in use, the elastic element(s) disposed between the mass block and the wall of the vibration absorption cavity can be under pre-compressed condition, and a displacement of the elastic element(s) caused by pre-compression is larger than a vibration amplitude of the mass block during uses relative to the wall of the vibration absorption cavity. Particularly for the metallic spring, it is typically needed to be pre-compressed when being assembled with the mass block and the coupling frame during the manufacturing process of this invention. In addition, the elastic element(s) is/are integrally connected with the mass block and the wall of the vibration absorption cavity respectively by bonding with adhesive material, soldering or vulcanizing.

The rail vibration absorber of the present invention can also comprise a damping element(s). The damping element(s) is/are disposed between the mass block and the wall of the vibration absorption cavity. The damping element(s) can be made of elastic and solid damping material. The damping element(s) can also be made of liquid damping material. When liquid damping is added, a seal is disposed at an opening of the vibration absorption cavity. The seal encloses the vibration absorption cavity completely and the liquid damping material is filled in a portion of gap between the mass block and the wall of the vibration absorption cavity. In order to further improve damping performance of the system, it is also possible to dispose movable blades on the mass block, stationary blades cooperating alternately with the movable blades are disposed on the wall of the vibration absorption cavity, and the liquid damping material is filled in a portion of gap between adjacent stationary and movable blades. In addition, it is also possible to dispose flow-disturbing holes or flow-disturbing concave-convex structures on the movable and/or stationary blades. It is possible to dispose flow-disturbing holes or flow-disturbing concave-convex structures on the mass block as well.

In order to assembling with the steel rail conveniently, a connection plate may be disposed on the coupling frame, and a connecting hole, a bent connecting portion or a snapping structure may be disposed on a connection plate. In order to improve reliability of connection between the elastic elements and the coupling frame or the mass block, a connection reinforcement structure may be disposed on a wall surface of the vibration absorption cavity cooperating with the elastic element(s) or a mating surface of the mass block cooperating with the elastic element(s), and wherein the connection reinforcement structure comprises a surface concave-convex structure, a surface knurling structure or a surface galling structure.

More than one vibration absorption cavities may be disposed in the coupling frame side-by-side in the vertical direction of the steel rail, and/or in the transverse direction of the steel rail, and/or along the longitudinal direction of the steel rail.

Furthermore, it needs to be explained that the coupling frame of the rail vibration absorber of the present invention is disposed on the non-working surface of the steel rail along the longitudinal direction of the steel rail. The non-working surface of the steel rail comprises the lower portion of the railhead, rail web, wing, and bottom surface of the rail outside the border when the steel rail is in use.

Advantages of the present invention caused by the mass block-spring system consisting of the mass block and the elastic element(s) disposed in the coupling frame are:

(1) The coupling frame provides effective protection for the mass-spring system consisting of the mass block and the elastic element(s). In particular, when high polymer elastic material is used, the elastic material is not susceptible to aging so that service life of its products is substantially prolonged.

(2) Since that the mass block of the present invention is not enclosed within the elastic elements, unlike that of the prior arts, and that the mass block of the present invention only connects with the elastic elements in series, materials of the elastic elements can be selected from a wider range, and makes use of metallic spring possible, which can take full advantage of high elasticity, stable physical properties influenced little by environments, such as humidity and so on, more efficient and stable vibration attenuating performance and long service life.

(3) In addition to tuned mass damping, the mass block and the coupling frame constrain the elastic element(s) and damping element(s) when amplitudes of vibration of the mass block and the coupling frame are larger than ½ wavelength of a modal frequency, and relative deformation between the mass block and the coupling frame will shear the damping material therebetween, realizing an additional energy dissipating caused by shear deformation, and hence a more significant vibration reducing effect.

(4) The rail vibration absorber of the invention makes a breakthrough in structure and applies fewer constraints to the elastic elements. Thus, materials of the elastic elements can be chosen from a wider range. For low-frequency and high-frequency, rubber can be replaced by elastic elements such as the metallic springs in order to avoid drawbacks of existing kind of rubber elastic elements, such as temperature sensitivity. Thus, the rail vibration absorber is applicable to a wider parameter range, has more stable performance and better weatherability.

(5) Since that space available on surface of the steel rail is very limited, and that the mass block of the present invention are not disposed within the elastic element(s), the elastic element(s) requires less space, and thus a larger and heavier mass block can be disposed under same space condition, which in turn effectively improves turned mass vibration reducing effect.

(6) The elastic elements, the damping material, and the adhesive material can be optimized individually, and each can be produced in large scale in factories, resulting in stable parameters, wherein the adhesive material provides adhesion strength, the elastic material provides frequency tuning, and the damping material provides energy dissipating.

(7) Even in case of breaking of the elastic material, the mass block of the rail vibration absorber would not fall off, which provides safety and reliability.

(8) The elastic elements are disposed to the left and the right of the mass block, and above and under the mass block separately. Therefore the same mass block can be independently adjusted in the vertical and transverse directions of the steel rail to realize tuned mass vibration reducing in the both directions.

(9) The rail vibration absorber is a finished product when leaving factories. Working frequency of the product can be accurately measured and tuned before leaving factories. Thus, no tuning on field is required. Only bonding, clipping or connecting by fasteners is needed.

(10) If the elastic elements are pre-compressed, rigidity of the elastic elements and working frequency of the vibration absorber would not change, even if the material breaks or internal cracks are formed.

In sum, the rail vibration absorber of the present invention has simple structure, good vibration and noise reduction effect, stable performance, outstanding weatherability, wider applicable frequency range, long service life and great cost performance ratio. It slows wear to the steel rail and prolongs the service life thereof, and thus, has great market potential in applications.

DETAILED DESCRIPTION

The First Embodiment

Figure 1:
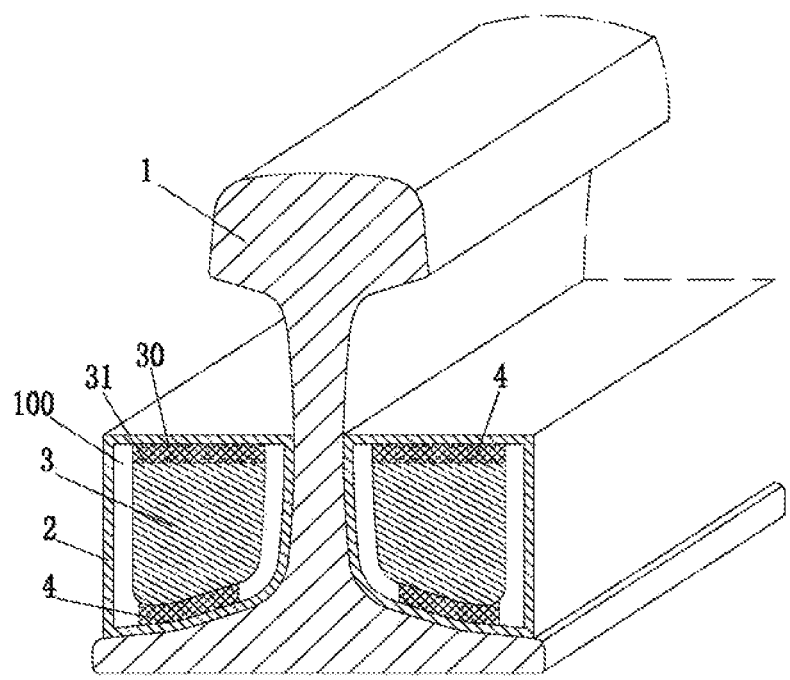
FIG. 1 is a structure schematic view and application schematic view of a first embodiment of a rail vibration absorber of the invention.

A rail vibration absorber of the invention shown in FIG. 1 comprises an elastic element 4 and a mass block 3. It additionally comprises a coupling frame 2. Surface shapes of portions of the coupling frame 2 coupling with a wing plate and a rail web of a steel rail 1 are same as shapes of corresponding surface of the steel rail. The coupling frame 2 comprises a vibration absorption cavity 100 in which the mass block 3 is disposed. The elastic element(s) 4 is/are disposed between the mass block 3 and a wall of the vibration absorption cavity 100. Specifically, the elastic element(s) 4 is/are disposed between the mass block 3 and the wall of the vibration absorption cavity 100 in a vertical direction of the steel rail. The coupling frame 2 is made of aluminum alloy material and the elastic element(s) 4 is/are made of rubber material. Since the rubber material has good damping performance, it is commonly used as an elastic solid damping material. Thus, the elastic element(s) 4 serve(s) as a damping element at the same time. The mass block 3 is an iron block, wherein the elastic element(s) 4 is/are affixed to the mass block 3 and the coupling frame 2 by a vulcanization process, respectively. In order to improve reliability of connection between the elastic element(s) and the coupling frame and between the elastic element(s) and the mass block, a connection reinforcing structure(s) is/are disposed on a portion of mating surfaces of the coupling frame and the elastic element(s) and on a portion of the mating surfaces of the mass block and the elastic element(s). Specifically, the connection reinforcement structure(s) is/are a concave-convex structure 30 disposed on corresponding surface of the coupling frame 2 and a concave-convex structure 31 disposed on corresponding surface of the mass block 3.

In their applications, as shown in FIG. 1, assembly of the rail vibration absorber of the invention and the steel rail can be achieved by firmly bounding the coupling frame 2 to corresponding surfaces of the steel rail along a longitudinal direction of the steel rail using adhesive materials. It should be noted that the rail vibration absorber of the invention does not need to be arranged on the steel rail consecutively and that the rail vibration absorber can be installed section by section on non-working surface of the steel rails between rail sleepers while avoiding rail auxiliary elements such as fasteners and rail splices, which applies to all technical solutions mentioned in the present invention, and is illustrated collectively hereby. Other than by bonding, it is also possible to reinforce fixing effect by other means, such as by auxiliary spring clips, which are belong to commonly used means for mounting of the art, and fall into protection scope claimed by the invention. When the steel rails vibrate under excitation of wheels, a mass-spring tuned system consisting of the mass block and the elastic element(s) produce work by applying a reactive force to dissipate energy so that the vibration of the steel rails is attenuated and tends to stop. Moreover, the coupling frame, the elastomer and mass block form a constrained damping and energy dissipating structure. When amplitudes of vibration of the mass block and the coupling frame are larger than ½ wavelength of a modal frequency, during movement of the mass block towards the coupling frame while compressing the elastic element(s), the mass block and the coupling frame constrain the rubber material, and relative deformation between the mass block and the coupling frame shears the rubber material therebetween, realizing an additional energy dissipating caused by shear deformation, and hence a better vibration attenuating and energy dissipating effect. Furthermore, since vibration energy of the steel rails is attenuated quickly, correspondingly, strength of noise radiation produced by the vibration is reduced rapidly. Thus, the rail vibration absorber of the invention can result in good vibration and noise reducing effect. Meanwhile, it can also attenuate wear to the steel rail and prolong service life thereof. It should be noted that, in this embodiment, although the elastic elements 4 are disposed respectively between upper and lower surfaces of the mass block 3 and the coupling frame 2 in vertical direction of the steel rails, the rail vibration absorber in this embodiment of the present invention can control vibration of the steel rails in both vertical and transverse directions simultaneously, since the elastic elements 4 have some elasticity in the transverse direction transverse of the steel rails. In practical applications, it is possible to optimize the elasticity of the elastic element(s) 4 and overall weight of the mass block 3 to realize control of vibrations under different frequencies. In uses, this can be realized by alternatively disposing rail vibration absorbers of the present invention for control of vibrations under different frequencies on the non-working surfaces of the steel rails.

Materials of the elastic elements, the mass block and the coupling frame in the present invention can be selected in a variety of materials. For example, the elastic elements can comprise at least one of rubber, elastic polyurethane or metallic spring; the mass block can be made of materials with high specific gravity such as steel and iron; the coupling frame can be made of corrosion resistive materials with high strength such as stainless steel, aluminum alloy, fiberglass reinforced steel and so on. Certainly, specific connection processes of the elastic elements and the coupling frame, and the mass block and the coupling frame are different, depending on specific materials of the elastic elements, the mass block and the coupling frame. For example, vulcanization, thermal lamination, adhesion, or soldering and so on, can be used, as long as the elastic elements, the mass block and the coupling frame can be firmly connected together, all of which can have the same effect, and hence fall into the protection scope claimed by the present invention. Furthermore, it is possible to dispose the connection reinforcement structures only at the mating surfaces of the coupling frame and the elastic elements, or only at the mating surfaces of the mass block and the elastic elements, depending on specific materials of the elastic elements, the mass block and the coupling frame. Specific configurations of the surface concave-convex structure, which belongs to one of the connection reinforcement structures, can be of various forms, such as ridges, recesses, consecutive ribs, or consecutive slots. Cross-sectional shapes of the surface concave-convex structure could be various shapes, such as rectangle, trapezoid, arc-shape, triangular, T-shape, and so on. In addition to above-mentioned surface concave-convex structures, the connection reinforcement structures could be in other forms (not shown in drawings respectively, and illustrated only in text), such as surface knurling structures or surface galling structures, which can achieve good effect as well, and are within the scope of the present invention.

Compared to prior arts, the rail vibration absorber of the present invention, which has the mass-spring system consisting of the mass block and the elastic elements disposed within the coupling frame, has following advantages:

(1) The coupling frame provides effective protection for the mass-spring system consisting of the mass block and the elastic element(s). In particular, when high polymer elastic material is used, the elastic material is not susceptible to aging so that service life of its products is substantially prolonged.

(2) Since that the mass block of the present invention is not enclosed within the elastic elements, unlike that of the prior arts, and that the mass block of the present invention only connects with the elastic elements in series, materials of the elastic elements can be selected from a wider range, and makes use of metallic spring possible, which can take full advantage of high elasticity, stable physical properties influenced little by environments, such as humidity and so on, more efficient and stable vibration attenuating performance and long service life.

(3) In addition to tuned mass damping, the mass block and the coupling frame constrain the elastic element(s) and damping element(s) when amplitudes of vibration of the mass block and the coupling frame are larger than ½ wavelength of a modal frequency, and relative deformation between the mass block and the coupling frame will shear the damping material therebetween, realizing an additional energy dissipating caused by shear deformation, and hence a more significant vibration reducing effect.

(4) The rail vibration absorber of the invention makes a breakthrough in structure and applies fewer constraints to the elastic elements. Thus, materials of the elastic elements can be chosen from a wider range. For low-frequency and high-frequency, rubber can be replaced by elastic elements such as the metallic springs in order to avoid drawbacks of existing kind of rubber elastic elements, such as temperature sensitivity. Thus, the rail vibration absorber is applicable to a wider parameter range, has more stable performance and better weatherability.

(5) Since that space available on surface of the steel rail is very limited, and that the mass block of the present invention are not disposed within the elastic element(s), the elastic element(s) require(s) less space, and thus a larger and heavier mass block can be disposed under same space condition, which in turn effectively improves turned mass vibration reducing effect.

(6) The elastic elements, the damping material, and the adhesive material can be optimized individually, and each can be produced in large scale in factories, resulting in stable parameters, wherein the adhesive material provides adhesion strength, the elastic material provides frequency tuning, and the damping material provides energy dissipating.

(7) Even in case of breaking of the elastic material, the mass block of the rail vibration absorber would not fall off, which provides safety and reliability.

(8) The elastic elements are disposed to the left and the right of the mass block, and above and under the mass block separately. Therefore the same mass block can be independently adjusted in the vertical and transverse directions of the steel rail to realize tuned mass vibration reducing in the both directions.

(9) The rail vibration absorber is a finished product when leaving factories. Working frequency of the product can be accurately measured and tuned before leaving factories. Thus, no tuning on field is required. Only bonding, clipping or connecting by fasteners is needed.

(10) If the elastic elements are pre-compressed, rigidity of the elastic elements and working frequency of the vibration absorber would not change, even if the material breaks or internal cracks are formed. On the other hand, when in use of control of high-frequency vibration, since vibration amplitude of the mass block is less, rigidity of the elastic elements pre-compressed changes linearly, which renders easier design and more accurate control. Thirdly, in case of breaking of the elastic material, since the elastic elements are pre-tightened, the mass block would not fall off, which provides safety and reliability. The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

In a word, the rail vibration absorber of the present invention has a simple structure, a good property of vibration and noise reducing, low cost, long service life and great cost performance ratio, which is advantageous to slow wearing of the steel rail and prolong the service life thereof, and thus provides very wide prospect of applications.

The Second Embodiment

Figure 2:
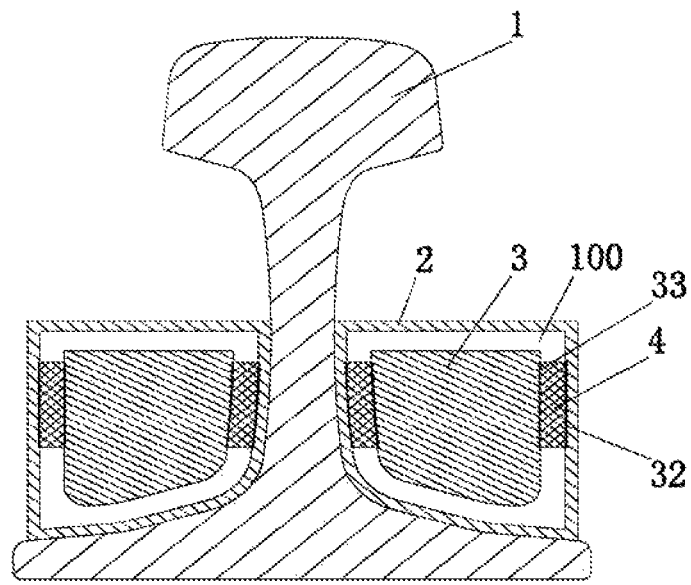
FIG. 2 is a structure schematic view and application schematic view of a second embodiment of the rail vibration absorber of the invention.

The rail vibration absorber of the present invention shown in FIG. 2 is different from that of the first embodiment in that the elastic element(s) 4 is/are disposed between the mass block 3 and one of wall surfaces of the vibration absorption cavity 100 that correspond to vertical direction of the steel rail 1. The coupling frame 2 is made of fiberglass reinforced steel, the elastic element(s) 4 is/are made of high damping elastic polyurethane material, and the mass block 3 is made of steel material, wherein the elastic element(s) 4 is/are affixed to the mass block 3 and one of the walls of the vibration absorption cavity 100 by chemically bonding process, respectively. In order to improve reliability of the connection between the elastic element(s) and the coupling frame and the connection between the elastic element(s) and the mass block, connection reinforcement structures are disposed on mating surfaces of the coupling frame and the elastic elements and on the mating surfaces of the mass block and the elastic elements. The connection reinforcement structures are a surface knurling structure 33 disposed on the corresponding surface of the mass block 3 and a surface galling structure 32 disposed on the corresponding surface of the coupling frame 2. Since the high damping elastic polyurethane material used by the elastic element(s) 4 has good damping performance, it is one of commonly used elastic solid damping materials. Thus, the elastic element(s) 4 also serve(s) as damping element(s). Furthermore, the elastic element(s) 4 is/are pre-compressed when being assembled with the mass block 3 and the coupling frame 2, and hence under a pre-compressed condition. Moreover, displacement of the pre-compressed elastic element(s) 4 is/are larger than vibration amplitude of the mass block 3 relative to the walls of the vibration absorption cavity 100.

Above-mentioned assembling method and technical solution in this embodiment and their advantages are generally same as that in the first embodiment, and hence would not be repeated. It should be noted that, in the rail vibration absorber of this embodiment, the elastic element(s) 4 is/are only disposed between the left side of the mass block 3 and the coupling frame 2 and between the right side of the mass block 3 and the coupling frame 2. Therefore, the rail vibration absorber in this embodiment is mainly used to control transverse vibration of the steel rails. Certainly, it can control vertical vibration of the steel rails to an extent. Comparing the technical solution in this embodiment with that in the first embodiment, since the elastic element(s) is/are pre-compressed, the rigidity of the elastic elements and the working frequency of the vibration absorber would not change even if the high damping elastic polyurethane material of the elastic elements breaks and hence has internal cracks, which can provide more stable and reliable vibration reducing effect.

In practical applications, it is possible to realize control of vibrations under different frequencies by optimizing elasticity of the elastic element(s) 4 and total weight of the mass block 3. In uses, depending on a plurality of main vibration frequencies of the steel rails, only thing needs to do is just alternatively arranging rail vibration absorbers of the present invention for control of corresponding vibrations under different frequencies on the non-working surfaces of the steel rails.

Based on a technical principle mentioned in the first embodiment, it is also possible not to pre-compress the elastic element(s) disposed between the mass block and the coupling frame during assembling of the rail vibration absorber in this embodiment of the invention. In practical applications, it is possible to choose whether or not to pre-compress the elastic elements based on characteristics of the vibration frequencies of structure of the rails that need to be controlled.

The Third Embodiment

Figure 3:
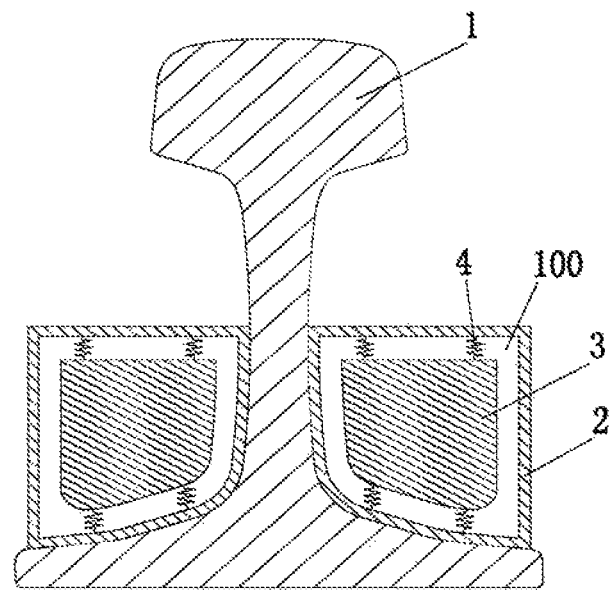
FIG. 3 is a structure schematic view and application schematic view of a third embodiment of the rail vibration absorber of the invention.

The rail vibration absorber of the present invention shown in FIG. 3 is different from that of the first embodiment in that the coupling frame 2 is made of steel and that the elastic element(s) 4 is/are disposed between the mass block 3 and one of walls of the vibration absorption cavity 100 that correspond to transverse direction of the steel rail 1. The elastic element(s) 4 is/are a metallic spring, and particularly a coil steel springs in this embodiment, both ends of which are soldered to the coupling frame 2 and the mass block 3, respectively. Moreover, in uses, in order to guarantee consistent and effective support to the mass block 3 by the elastic elements 4, the elastic element(s) 4 is/are pre-compressed and under pre-compressed condition when it is assembled with the mass block 3 and the coupling frame 2, and displacement of the pre-compressed elastic element(s) 4 is/are larger than a vibration amplitude of the mass block 3 relative to corresponding wall of the vibration absorption cavity 100 when the mass block 3 is in use.

An applying method of above-mentioned technical solution of this embodiment is the same as that in the first embodiment, and hence is not repeated. Furthermore, compared with the rail vibration absorber in the first embodiment, the rail vibration absorber in this embodiment has following advantages: since the coil steel springs are used as the elastic elements, and the coil steel springs have good elasticity in both vertical and transverse directions, the rail vibration absorber in this embodiment can control vibrations in both the vertical and the transverse directions simultaneously by controlling relationship between rigidity of the coil steel spring in the vertical direction and the transverse direction, and physical performance of the coil steel springs is less influenced by ambient environment factors, such as temperature, humidity and so on, properties of vibration reducing of the coil steel springs are more efficient and stable, and service life is longer. Additionally, other than the coil steel springs mentioned above, the metallic springs that are used as elastic elements can also be disk springs and plate springs, all of which can obtain excellent results and are within the scope of the invention. Certainly, as for the elastic element(s) which comprise(s) metallic spring(s) separately, in order to ensure consistent and effective support to the mass block by the elastic element(s) during their uses, the elastic element(s) is/are preferably pre-compressed when assembled with the mass block and the coupling frame during manufacturing, which applies to other technical solutions in the present invention in which the elastic element(s) comprise(s) the metallic spring(s) separately, and is/are illustrated collectively hereby.

Certainly, it is not excluded from the present invention that the elastic element(s) is/are not pre-compressed. That is to say, it is possible for the elastic element(s) not be pre-compressed as desired. For example, in this embodiment, ends of a metallic coil spring can be soldered or bonded to the mass block and the coupling frame respectively without the metallic coil spring being pre-compressed. It is needed to be pointed out that having ends of the metallic coil spring in this embodiment soldered to the mass block and the coupling frame could achieve certain special functions other than positioning. For example, have several spring coils at both ends of the metallic coil spring locked by adhesive materials can eliminate initially nonlinear rigidity problem of the spring induced by manufacturing error and/or assembling error of the metallic coil spring, which is within the scope of the invention. Generally speaking, it is required to pre-tighten the elastic elements to control high-frequency vibrations, and it is not required to pre-tighten the elastic elements to control low-frequency vibrations. In practical applications, it is possible to determine whether or not to pre-tighten the elastic elements depending on characteristics of the vibration frequencies of the structure that needs to be controlled.

The Fourth Embodiment

Figure 4:
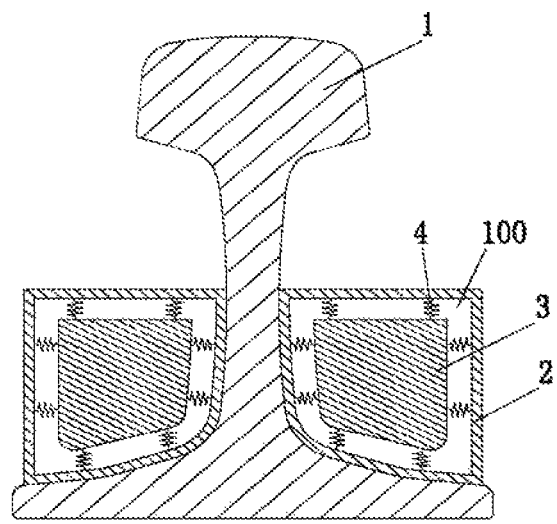
FIG. 4 is a structure schematic view and application schematic view of a fourth embodiment of the rail vibration absorber of the invention.

The rail vibration absorber shown in FIG. 4 is different from that in the third embodiment in that the elastic element(s) 4 consisting of the coil steel spring(s) is/are disposed both between the mass block 3 and one of the walls of the vibration absorption cavity 100 that is in transverse direction of the steel rail and between the mass block 3 and one of the walls of the vibration absorption cavity 100 that is in vertical direction of the steel rail at the same time.

Compared with the elastic element(s) in the third embodiment, the elastic element(s) in this embodiment is/are disposed independently to the left and right of the mass block, and is disposed above and under of the mass block. The frequencies in the vertical and transverse directions of the steel rail of the same mass block can be adjusted independently. Thus, tuned mass vibration reducing in both of the directions is realized, and the tuned mass vibration reducing in both of the directions has little interference with each other, which provides higher control accuracy. Furthermore, since the elastic element(s) support(s) the mass block completely from all sides, movement of the mass block is more stable during uses and does not prone to produce swinging moment and tipping moment.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Fifth Embodiment

Figure 5:
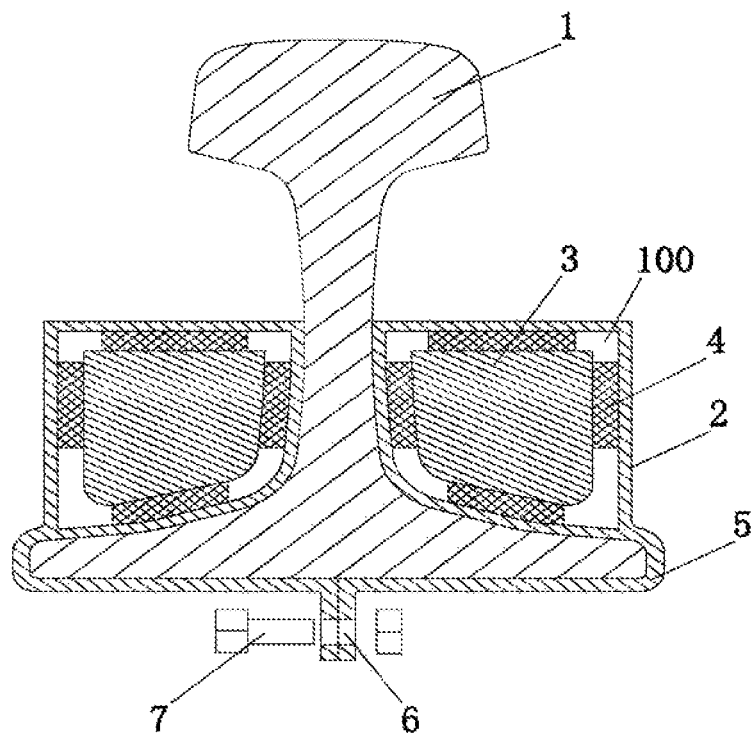
FIG. 5 is a structure schematic view and application schematic view of a fifth embodiment of the rail vibration absorber of the invention.

The rail vibration absorber shown in FIG. 5 is different from that shown in FIG. 4 in that the elastic element(s) 4 disposed around the mass block 3 is/are made of elastic polyurethane material. Moreover, a connection plate 5 is disposed on the coupling frame 2, and a connecting hole 6 is disposed on the connection plate 5.

In applications, as shown in FIG. 5, in addition to adhering the rail vibration absorbers of the invention disposed at both sides of the steel rail 1 to corresponding surfaces of the steel rail, the connection plate 5 is used to be snapped at bottom of the steel rail, and a fastener 7 goes through the connection hole 6 to connect portions of the connection plate 5 of the rail vibration absorber of the present invention disposed at left and right sides of the steel rail, which can further improve stability of assembling of the steel rail and the rail vibration absorber of the present invention. Even if bonding via adhesive material fails, the rail vibration absorber can still be fixed to the corresponding surfaces of the steel rail and not fall off. Furthermore, since the connection between the coupling frame and the steel rail is reliable, and the elastic element(s) 4 is/are pre-tightened, the mass block 3 do not come off from the vibration absorption cavity 100 easily even the mass block 3 is separated from the elastic element(s) 4, which will not cause hidden safety problems to operating of trains.

Certainly, based on the technical principle in the first embodiment, during assembling of the rail vibration absorber of the present invention in this embodiment, it is possible not to pre-compress the elastic element(s) disposed between the mass block and the coupling frame. In practical applications, it is possible to select whether or not to pre-tighten the elastic element(s) depending on characteristics of the vibration frequencies of the rail structure that needs to be controlled.

The Sixth Embodiment

Figure 6:
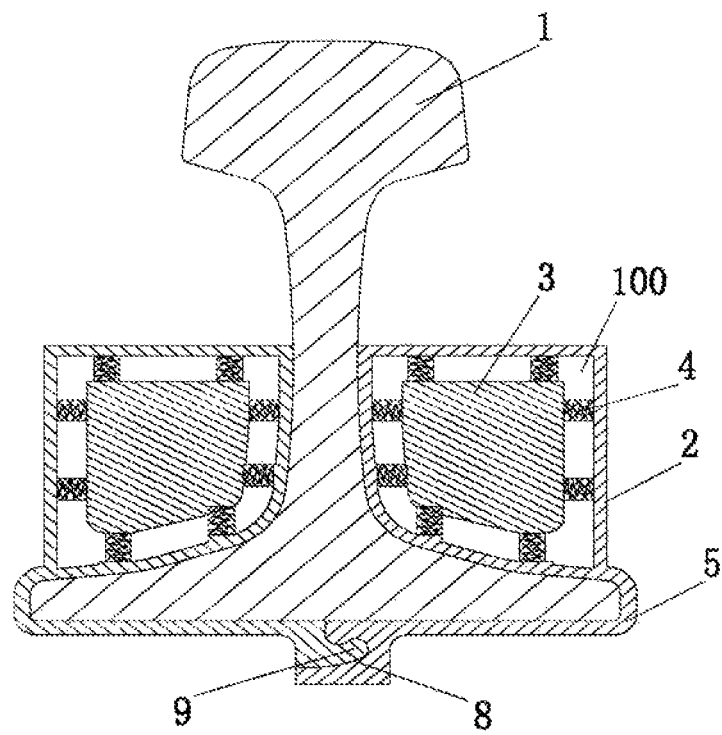
FIG. 6 is a structure schematic view and application schematic view of a sixth embodiment of the rail vibration absorber of the invention.

The rail vibration absorber of the invention shown in FIG. 6 is different from that in the fifth embodiment in that the elastic element(s) 4 is/are a composite spring consisting of rubber and a metallic spring. Furthermore, there are disposed on the connection plate 5 buckle structures, which comprise a slot 8 and a jaw 9 disposed respectively on the connection plate 5 for mating with each other. In applications, in addition to bonding via adhesive material, the buckle structures are also used to snap together the rail vibration absorbers of the invention disposed at both sides of the steel rail, and hence firmly assembly the steel rail and the rail vibration absorber integrally. At the same time, the rubber material in the elastic element(s) 4 can be a damping element(s).

In above-mentioned technical solution of this embodiment, the elastic element(s) 4 is/are made of the composite spring consisting of rubber and the metallic spring. Utilizing rubber-metallic composite springs can not only fully employ high elasticity and long service life of the metallic springs but also use rubber material to effectively suppress resonance during the operation of the metallic springs, which is advantageous to further improve vibration reducing properties and prolong service life of the steel rails.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Seventh Embodiment

Figure 7:
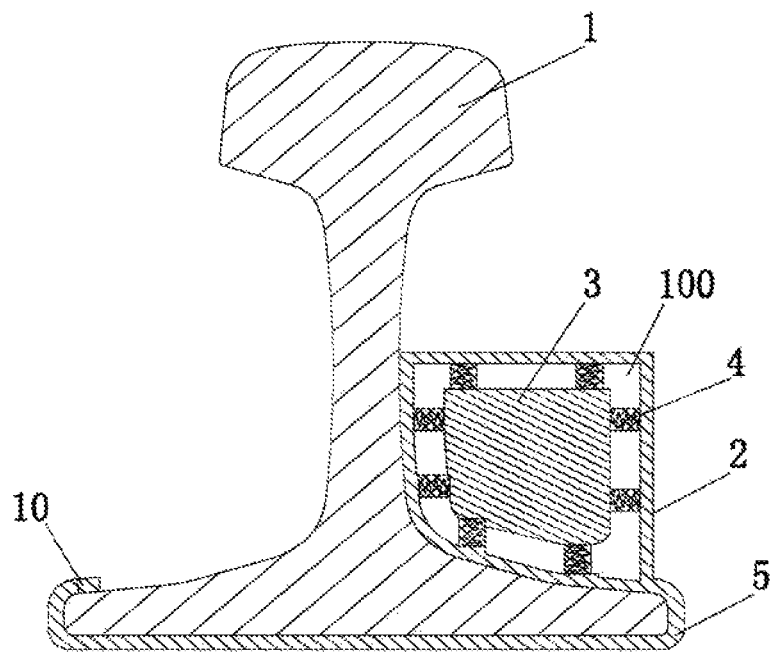
FIG. 7 is a structure schematic view and application schematic view of a seventh embodiment of the rail vibration absorber of the invention.

The rail vibration absorber of the invention shown in FIG. 7 is different from that in the sixth embodiment in that the connection plate 5 has a bent connection portion 10 disposed thereon. In applications, the coupling frame 2 conforms to the rail web and the wing plate on one side of the steel rail 1. The connection plate 5 covers whole bottom of the rail, and then the bent connection portion 10 is folded and snapped to the wing plate on the other side of the steel rail. By this way, assembling of the steel rail and the rail vibration absorber of the invention is realized.

Compared with that in the sixth embodiment, the rail vibration absorber in this embodiment employs the connection plate and the bent connection portion directly snapping to the non-working surface of the steel rail. Their installing and removing are quickly and conveniently, hence are convenient to maintenance, safe and reliable. In applications, the rail vibration absorbers can be arranged on the left side and the right side of the steel rail alternatively. Furthermore adhesive material can be used along with the connection plate to additionally bond the rail vibration absorbers of the invention to the steel rail. When using the bent connection portion to assembling the rail vibration absorber to the steel rail directly, it is also possible to add a layer of solid damping material on contact surfaces between the coupling frame 2 and the steel rail and contact surfaces between the connection plate 5 and the steel rail in order to prevent noise caused by impacting of metals between the coupling frame and the steel rail, if the coupling frame is made of metallic material. In this case, the coupling frame 2, the connection plate 5, the steel rail 1 and the layer of solid damping material can also form a constrained damping structure, and hence can provide an enhanced energy dissipating capacity and improved vibration reducing effect, which will not be illustrated as for each drawing but is within the scope of the invention.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Eighth Embodiment

Figure 8:
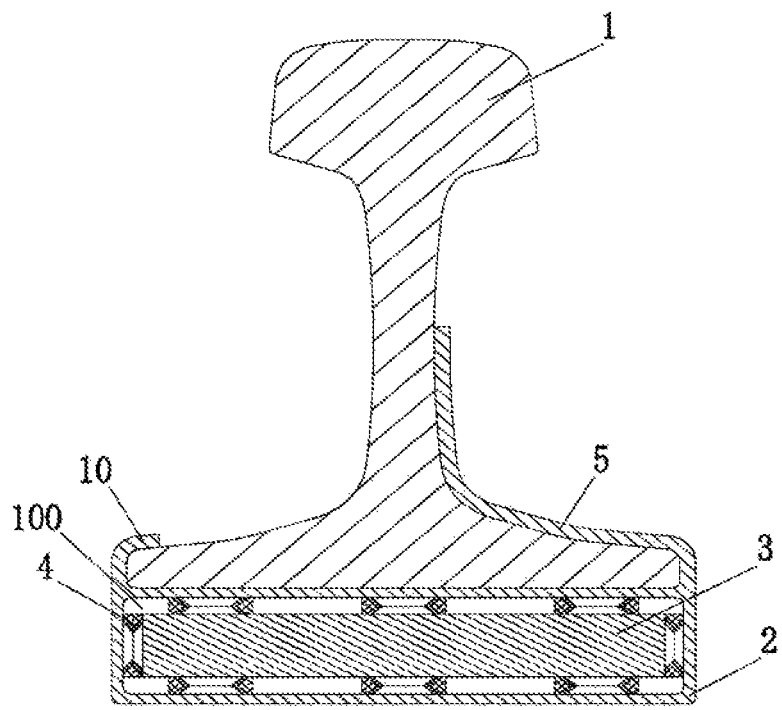
FIG. 8 is a structure schematic view and application schematic views of an eighth embodiment of the rail vibration absorber of the invention.

The rail vibration absorber of the invention shown in FIG. 8 is different from that in the seventh embodiment in that the coupling frame 2 is snapped to the bottom of the rail by the connection plate 5 and the bent connection portion 10 disposed on the connection plate 5 so that assembling between the rail vibration absorber and the steel rail is realized. Furthermore, the elastic element(s) 4 in the vibration absorption cavity 100 is/are a composite spring that consists of a metallic disk spring and elastic polyurethane material, wherein ends of the metallic disk spring are fixed to and soldered with adjacent coupling frame 2 and the mass block 3 integrally.

Compared with the seventh embodiment, the rail vibration absorber in this embodiment uses the composite spring that consists of the metallic disk spring and the elastic polyurethane material as the elastic element(s) 4, which can fully employ advantages of great carrying capacity, long service life and space saving of the disk springs. Furthermore, space under the bottom of the steel rail can be fully employed, which is advantageous to leave space for disposing a larger mass block, and further improve vibration reducing performance. Alternatively, as mentioned in the seventh embodiment, it is also possible to add a layer of solid damping material on contact surfaces between the coupling frame 2 and the steel rail and contact surfaces between the connection plate 5 and the steel rail in order to prevent noise caused by impacting of metals between the coupling frame and the steel rail, if the coupling frame is made of metallic material.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Ninth Embodiment

Figure 9:
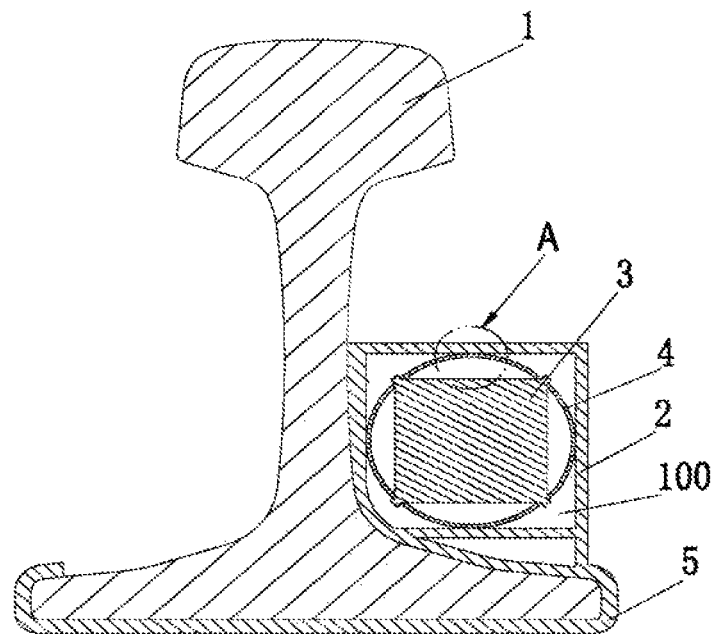
FIG. 9 is a structure schematic view and application schematic view of a ninth embodiment of the rail vibration absorber of the invention.
Figure 10:
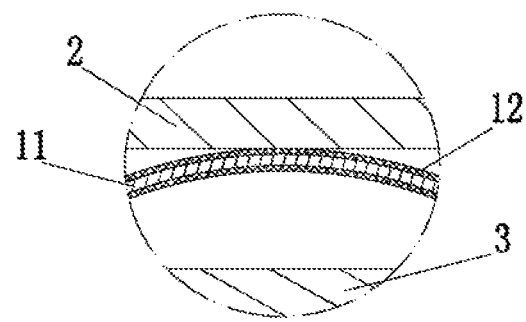
FIG. 10 is a first enlarged view of portion A in FIG. 9.

The rail vibration absorber of the invention shown in FIGS. 9 and 10 is different from that in the seventh embodiment in that the elastic element(s) 4 is/are a plate spring. The plate spring consists of metallic spring piece 11 made of spring steel and a rubber layer 12 coated on its surface. The mass block 3 has corresponding position-limiting channels for receiving the plate spring. It needs to be pointed out that in the elastic element(s) 4, the metallic spring piece 11 mainly used to provide elasticity and the rubber layer 12 is used to provide damping. Thus, the rubber layer 12 serves as a damping element in this case.

An applying method of this embodiment of the present rail vibration absorber is exactly same as that in the seventh embodiment, and hence will not be repeated. Compared with the seventh embodiment, in addition to the energy dissipating and vibration reducing realized by a tuned system consisting of the mass block and the elastic element(s), energy dissipating by shearing can be realized by the metallic spring pieces 11 of the elastic element(s) of the present rail vibration absorber in this embodiment consistently shearing the rubber layer 12 between the metallic spring pieces 11 and the coupling frame under the constrains from the coupling frame. Thus, a faster energy dissipating and hence a better vibration reducing performance is achieved.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations.

In practical applications, it is possible to select whether or not to pre-tighten the elastic elements depending on characteristics of the vibration frequencies of the structure that needs to be controlled.

The Tenth Embodiment

Figure 11:
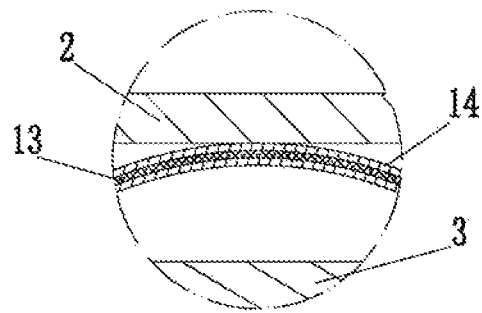
FIG. 11 is a second enlarged view of portion A in FIG. 9.

The rail vibration absorber of the invention shown in FIGS. 9 and 11 is different from that in the ninth embodiment in that the elastic element(s) 4 consist(s) of a plate spring(s). The plate spring(s) consist(s) of two metallic spring pieces 14 made of spring steel and a rubber layer 13 therebetween. Similar to that in the ninth embodiment, the rubber 13 also acts as a damping element.

An applying method of this embodiment and its advantages are substantially same as that in the ninth embodiment. One point that needs to be explained is that the constrained damping structure, directly comprised by the metallic spring pieces 14 and the rubber layer 13 in this embodiment, will consistently dissipate energy in uses. Since effective area of the metallic spring pieces 14 for shearing damping material therebetween is larger, energy dissipating caused by shearing damping is more, attenuating of vibration energy of the steel rail is more quickly, and vibration reducing is more efficient.

Again, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Eleventh Embodiment

Figure 12:
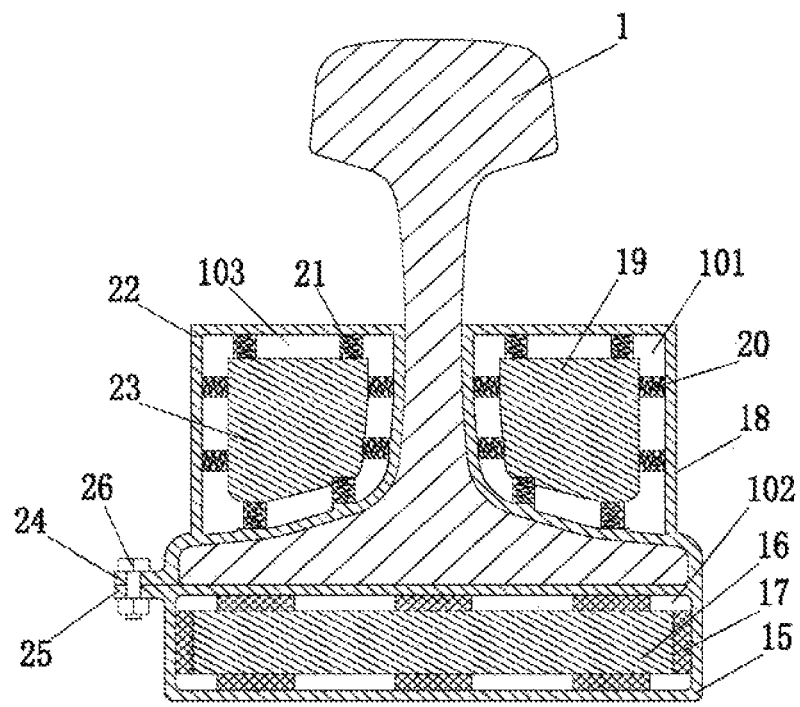
FIG. 12 is a structure schematic view and application schematic view of a tenth embodiment of the rail vibration absorber of the invention.

Based on the technical principles in FIGS. 6, 7 and 8, the rail vibration absorber of the invention shown in FIG. 12 comprises a coupling frame 18 disposed to the right side of the rail web of the steel rail 1, a coupling frame 15 disposed at the bottom of the rail and a coupling frame 22 disposed to the left side of the steel rail, wherein the coupling frame 18 and the coupling frame 15 are disposed integrally. The coupling frame 18 comprises a vibration absorption cavity 101, in which a mass block 19 is disposed. An elastic element(s) 20 is/are disposed between the mass block 19 and wall surfaces of the vibration absorption cavity 101 in vertical direction of a steel rail and between the mass block 19 and wall surfaces of the vibration absorption cavity 101 in transverse direction of the steel rail, respectively. The elastic element(s) 20 is/are compounded by a coil steel spring(s) and rubber material. The coupling frame 15 comprises a vibration absorption cavity 102, in which a mass block 16 is disposed. An elastic element(s) 17 is/are disposed between the mass block 16 and wall surfaces of the vibration absorption cavity 102 in vertical direction of the steel rail and between the mass block 16 and wall surfaces of the vibration absorption cavity 102 in transverse direction of the steel rail, respectively. The elastic element(s) 17 is/are made of rubber material. The coupling frame 22 comprises a vibration absorption cavity 103, in which a mass block 23 is disposed. An elastic element(s) 21 is/are disposed between the mass block 23 and wall surfaces of the vibration absorption cavity 103 in the vertical direction of the steel rail and between the mass block 23 and wall surfaces of the vibration absorption cavity 103 in the transverse direction of the steel rail, respectively. The elastic element(s) 21 is/are compounded by a coil steel spring(s) and rubber material. Furthermore, a connection plate 25 with a connection hole is disposed on the coupling frame 15. A connection plate 24 with a connection hole is disposed on the coupling frame 22. A fastener 26 is used to connect the connection plate 25 with the connection plate 24 integrally so that the steel rail and the rail vibration absorber of the invention are assembled together firmly.

Alternatively, it is possible to add a layer of damping material on contact surfaces of the invention and the steel rail in order to prevent noise caused by impacting of metals between the coupling frame and the steel rail. Moreover, it is also possible to further use adhesive material to bond the present invention with the steel rail in order to improve reliability of connection. They are all simple modifications of assembling of the invention, thus are within the scope of the invention.

In above-mentioned technical solution of this embodiment, the rail vibration absorber covers a majority of the non-working surfaces of the steel rail including the bottom, the wing plate and a portion of the rail web of the steel rail. It takes full advantages of space and is disposed more of the mass-spring tuned systems consisting of the mass block and the elastic element(s), which provides more quickly vibration energy dissipating of the steel rail and further improves vibration and noise reducing performance of the absorber. More importantly, since multiple vibration absorption cavities are disposed, it comprises a plurality of tuned systems consisting of a mass block and elastic elements, which can be of different tuned systems used to control vibration under different frequencies. Thus, the rail vibration absorber of the invention can control more vibration frequencies and thus has a better vibration reducing effect.

Figure 13:
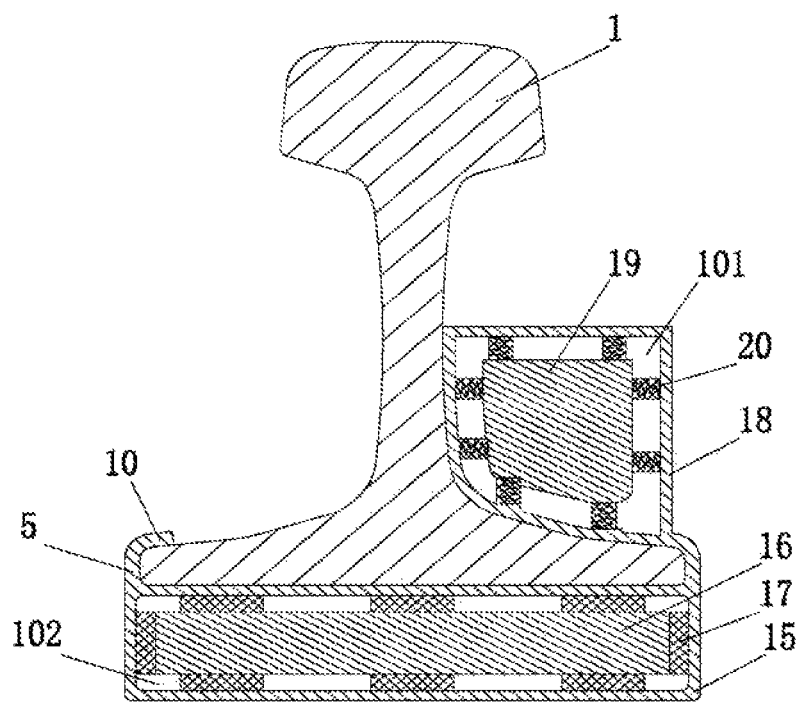
FIG. 13 is a structure schematic view and application schematic view of an eleventh embodiment of the rail vibration absorber of the invention.

Based on technical principle in this embodiment, it is possible for the rail vibration absorber of the invention shown in FIG. 13 to have the coupling frame 18 and the coupling frame 15 integrated together, and a connection plate 5 to be disposed on the coupling frame 15 with one end disposed a bent connection portion 10 for snapping to the steel rail 1, which can also obtain very good effect and hence are also within the scope of the invention.

In addition, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Twelfth Embodiment

Figure 14:
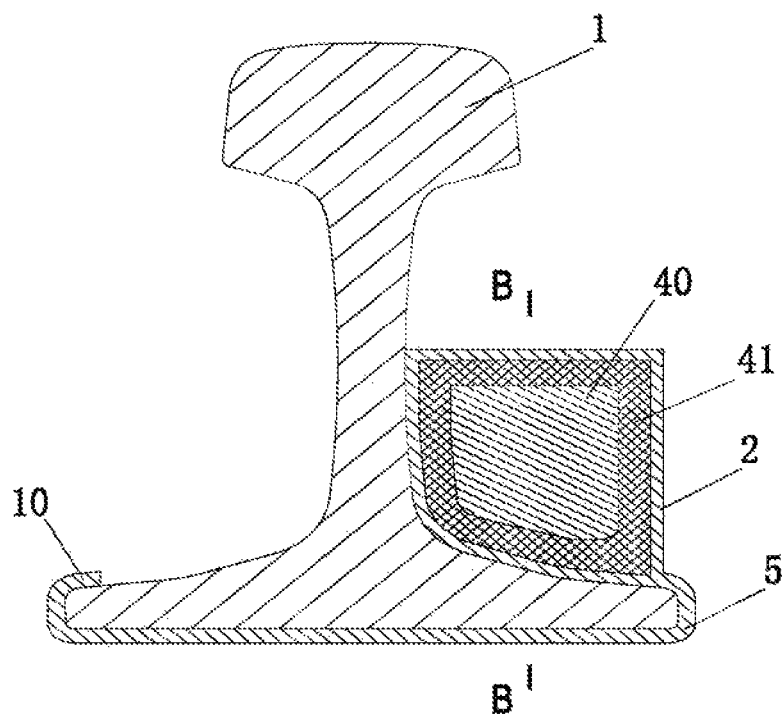
FIG. 14 is a structure schematic view and application schematic view of a twelfth embodiment of the rail vibration absorber of the invention.
Figure 15:
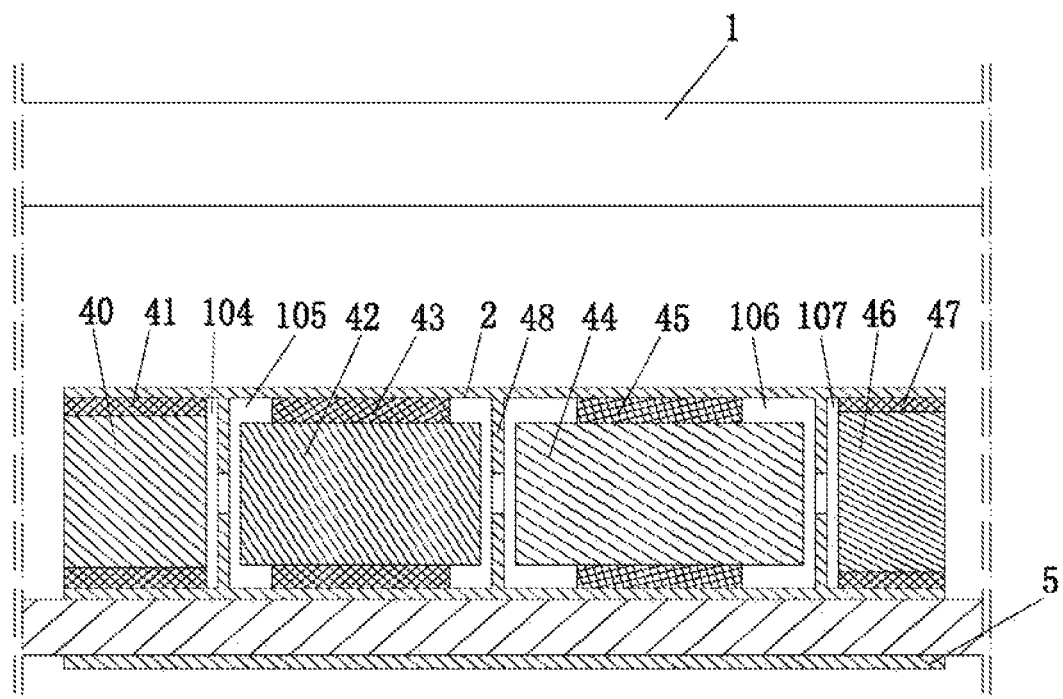
FIG. 15 is a cross-sectional view taken along B-B of FIG. 14.

The rail vibration absorber of the invention shown in FIGS. 14 and 15 is different from that in the seventh embodiment in that the coupling frame 2 has four vibration absorption cavities separated by dividers 48 along a longitudinal direction of the steel rail. Each vibration absorption cavity has a mass block and an elastic element(s) disposed therein. In a vibration absorption cavity 104, a mass block 40 and an elastic element(s) 41 are disposed therein with the elastic element(s) 41 disposed surround the mass block 40 between the mass block and walls of the vibration absorption cavity. In a vibration absorption cavity 105, a mass block 42 and an elastic element(s) 43 are disposed with the elastic element(s) 43 disposed surround the mass block 42 between the mass block and walls of the vibration absorption cavity. In a vibration absorption cavity 106, a mass block 44 and an elastic element(s) 45 are disposed with the elastic elements 45 disposed surround the mass block 44 between the mass block and walls of the vibration absorption cavity. In a vibration absorption cavity 107, a mass block 46 and an elastic element(s) 47 are disposed with the elastic element(s) 47 disposed surround the mass block 46 between the mass block and walls of the vibration absorption cavity. The mass blocks 40, 42, 44 and 46 are all made of cast iron. The elastic elements 41, 43, 45 and 47 are all made of high damping elastic rubber material, which can also act as damping elements.

An applying method of the rail vibration absorber in this embodiment is the same as that in the seventh embodiment, and hence is not repeated. Compared with the seventh embodiment, it is most advantageous that in above-mentioned technical solution of this embodiment, since four vibration absorption cavities of different sizes are disposed in the coupling frame along the longitudinal direction of the steel rail, hence size of each mass block in each vibration absorption cavity is different from one another and thickness of the elastic element(s) in each vibration absorption cavity is different from one another, by optimizing parameters of each mass block and the elastic element(s) in each vibration absorption cavity independently, each mass-spring tuned system consisting of the mass block and the elastic element(s) in each vibration absorption cavity can be used to control vibration under a certain frequencies, that is to say, can be used to control vibration under four frequencies simultaneously, which provides better vibration and noise reducing performance in uses. Furthermore, materials of the mass blocks in different vibration absorption cavities can be designed differently, and materials of the elastic element(s) in different vibration absorption cavities can be designed differently as well, all solutions of which can be used to effectively control vibration under a certain frequencies, as long as mass and rigidity of the elastic element(s) are properly adjusted, and are within the scope of the invention. Additionally, based on the technical principle in the fourth embodiment, elastic elements located to the left, right, up and down of the mass block respectively can be made of different materials, which makes frequencies of the mass blocks in vertical direction and transverse direction of the steel rail capable of being adjusted independently and can obtain tuned mass vibration reducing in both directions. The tuned mass vibration reducing in both directions has little interference to each other and can provide more accurate control, characteristic of which is applicable to other technical solutions in which elastic element(s) is/are disposed around the mass block and between the mass block and walls of the vibration absorption cavity and is illustrated collectively hereby. These are all within the scope of the invention.

Again, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Thirteenth Embodiment

Figure 16:
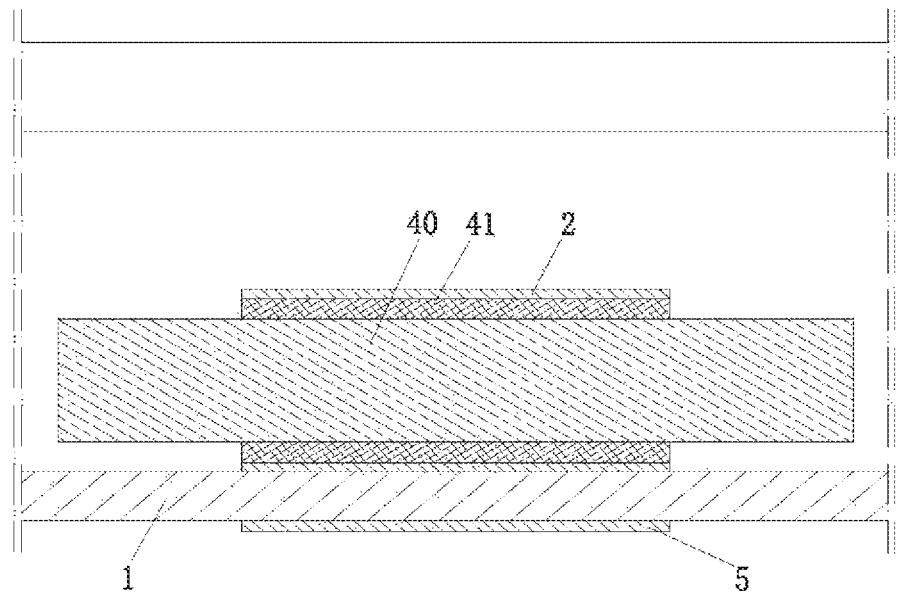
FIG. 16 is a structure schematic view and application schematic view of a thirteenth embodiment of the rail vibration absorber of the invention.

The rail vibration absorber of the invention shown in FIGS. 14 and 16 is different from that in the twelfth embodiment in that the coupling frame 2 comprises a vibration absorption cavity, in which a mass block 40 and an elastic element(s) 41 are disposed. The mass block 40 is made of cast steel. The elastic element(s) 41 is/are made of high damping elastic rubber material. The elastic element(s) 41 is/are disposed surround the mass block 40 between the mass block and walls of the vibration absorption cavity, which also acts as a damping element(s). Furthermore, only a middle portion of the mass block 40 is disposed in the vibration absorption cavity of the coupling frame 2, with both ends of the mass block 40 extending to outside of the coupling frame 2.

In addition to having all advantages of the rail vibration absorber of the invention shown in FIG. 5, since only a portion of the mass block is disposed in the vibration absorption cavity, parameters of mass and rigidity of the elastic elements can be adjusted conveniently, and since a larger mass block can be disposed, above-mentioned technical solution of this embodiment can be used not only for control of vibration under mid-frequencies and high-frequencies, but also for control of vibration under low frequencies, which has a wider applicable range. Similarly, the rail vibration absorber in this embodiment can be fixed on the non-working surface of the steel rail between adjacent rail sleepers along the longitudinal direction of the steel rail without interfering with rail elements such as fasteners during assembling. However, since length of the coupling frame 2 along the longitudinal direction of the steel rail is shorter than the mass block 40, the rail vibration absorber in this embodiment is also advantageous for material saving.

Again, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Fourteenth Embodiment

Figure 17:
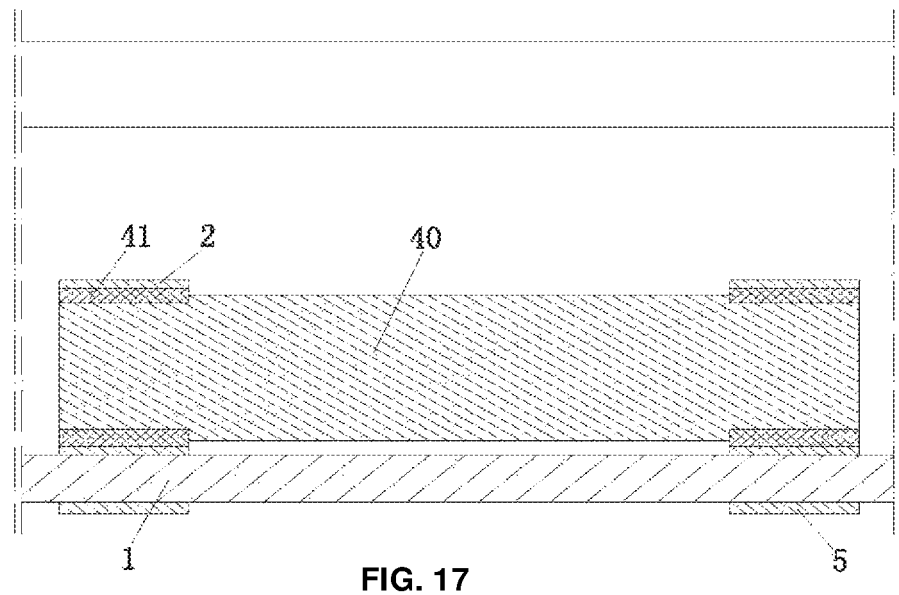
FIG. 17 is a structure schematic view and application schematic view of a fourteenth embodiment of the rail vibration absorber of the invention.

The rail vibration absorber of the invention shown in FIGS. 14 and 17 is different from that in the thirteenth embodiment in that it comprises two coupling frames 2, both of which are disposed at ends of the mass block 40, respectively. Each coupling frame 2 has the vibration absorption cavity, in which the mass block 40 and the elastic element(s) 41 are disposed, wherein the mass block 40 has only portions at its ends disposed in the vibration absorption cavity and its middle portion is exposed between the two coupling frames.

Compared with the thirteenth embodiment, above-mentioned technical solution in this embodiment is more convenient for manufacturing and assembling. Furthermore, size of cross-sectional area of the middle portion of the mass block can even larger than that of the cross-sectional area of the coupling frame, which is advantageous to employ a larger mass block, which can provide control of vibration under lower frequencies. Meanwhile, for both ends of the mass block cooperating with the elastic elements and the coupling frame, the rail vibration absorber of this embodiment is more stable during uses. Furthermore, it is also advantageous for the rail vibration absorber of this embodiment to reduce material used in coupling frame manufacturing, and hence to save cost.

Based on above-mentioned technical principle of this embodiment, three or more of coupling frames can be disposed, which is in the protection scope of the invention. In addition, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Fifteenth Embodiment

Figure 18:
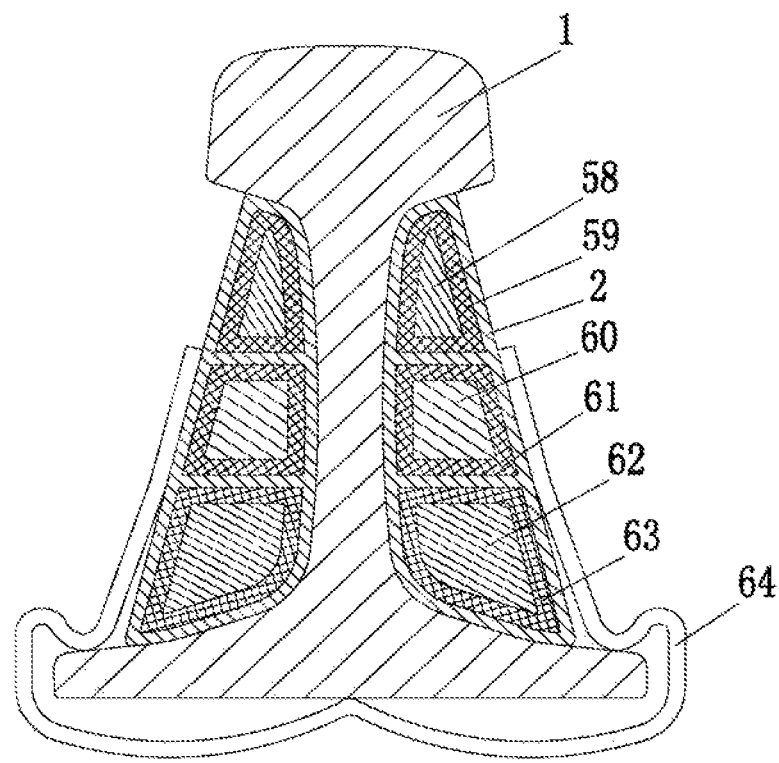
FIG. 18 is a structure schematic view and application schematic view of a fifteenth embodiment of the rail vibration absorber of the invention.

In addition that the plurality of vibration absorption cavities in the coupling frame are disposed along the longitudinal direction of the steel rail, as shown in FIG. 15, the rail vibration absorber of the invention shown in FIG. 18 is different from that in the twelfth embodiment in that the coupling frame 2 comprises three vibration absorption cavities, which are disposed in the direction vertical to the steel rail. An uppermost vibration absorption cavity has a mass block 58 and an elastic element 59 disposed therein. A middle vibration absorption cavity has a mass block 60 and an elastic element 61 disposed therein. A lowermost vibration absorption cavity has a mass block 62 and an elastic element 63 disposed therein. The mass blocks 58, 60 and 62 are all made of heavy concrete material. The elastic elements 59, 61 and 63 are all made of elastic polyurethane.

As shown in FIG. 18, in applications, the rail vibration absorber in this embodiment is bonded to bottom of a rail head and the rail web of the steel rail 1 by adhesive material. In order to enhance reliability of connection and fixation, a spring clip 64 is further used to clip the rail vibration absorber onto surface of the steel rail, and thus to accomplish assembling the rail vibration absorber of the invention to the steel rail.

Similar to the twelfth embodiment, the rail vibration absorber of the invention is capable of controlling vibrations under multiple frequencies by optimizing mass and rigidity of elastic elements, and is convenient for use. For example, it is possible to control deflective vibration at the rail head by using a tuned device consisting of the mass block 58 and the elastic element(s) 59, to control transverse and vertical vibrations at the rail web by using a tuned device consisting of the mass block 60 and the elastic element(s) 61, and to control vibrations of the wing plate and the rail web by using a tuned device consisting of the mass block 62 and the elastic element(s) 63. Pertinent control can be imparted depending on characteristics of vibration at different areas, which can provide better effect of vibration attenuating. The mass blocks are made of heavy concrete, and thus they are not susceptible to be corroded, have long service life and significantly reduce cost. Furthermore, the mass blocks and the elastic elements in different vibration absorption cavities can be made of different materials. For example, metallic springs, rubber springs and elastic polyurethane springs can be used, respectively. Also, it is also possible that the mass blocks are made of normal concrete or reinforced concrete, which can also achieve very good effect, and are within the scope of the invention.

Again, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Sixteenth Embodiment

Figure 19:
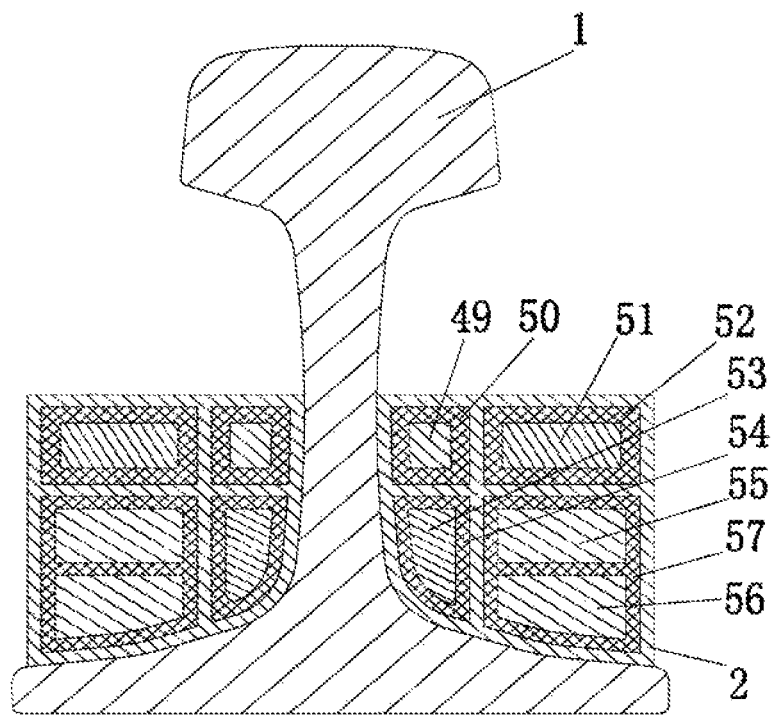
FIG. 19 is a structure schematic view and application schematic view of a sixteenth embodiment of the rail vibration absorber of the invention.

The rail vibration absorber of the invention shown in FIG. 19 is different from that in the fifteenth embodiment in that the coupling frame 2 comprises four vibration absorption cavities with the four cavities being arranged in a check pattern. An upper left vibration absorption cavity has a mass block 49 and an elastic element 50 disposed therein. An upper right vibration absorption cavity has a mass block 51 and an elastic element 52 disposed therein. A lower left vibration absorption cavity has a mass block 53 and an elastic element 54 disposed therein. A lower right vibration absorption cavity has mass blocks 55 and 56 and an elastic element 57 disposed therein. All the mass blocks are made of cast iron. All the elastic elements 50, 52, 54 and 57 are made of different rubber materials with different rigidities, respectively.

Similar to the fifteenth embodiment, the rail vibration absorber in this embodiment can control vibrations under multiple frequencies simultaneously as well. Particularly, for the lower right vibration absorption cavity has two mass blocks, it can control vibrations under different frequencies after parameter optimization, which can provide more efficient vibration attenuating.

It needs to be pointed out that based on technical principles in the twelfth, the fifteenth and the present embodiments, vibration absorption cavities in a coupling frame can be arranged in the vertical direction and/or transverse direction of the steel rail and/or in the longitudinal direction of the steel rail, which can control vibrations under multiple frequencies, and are convenient in uses. Again, the elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Seventeenth Embodiment

Figure 20:
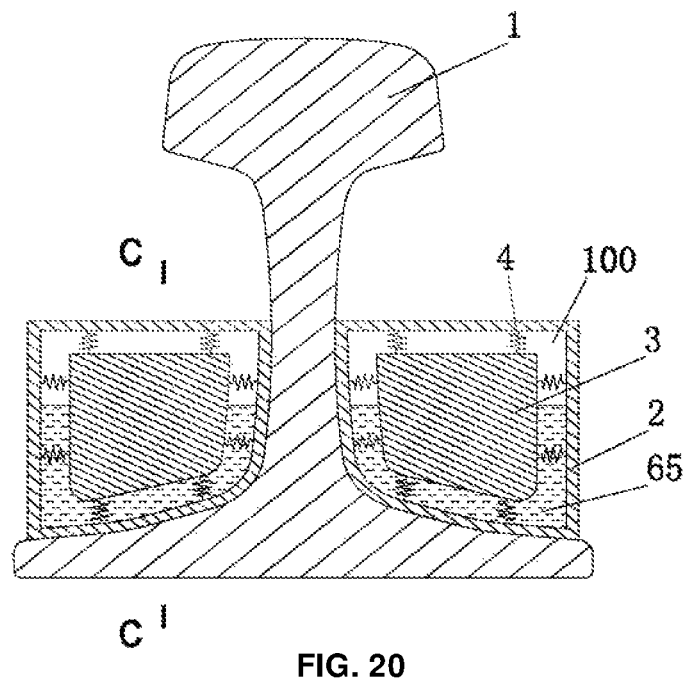
FIG. 20 is a structure schematic view and application schematic view of a seventeenth embodiment of the rail vibration absorber of the invention.
Figure 21:
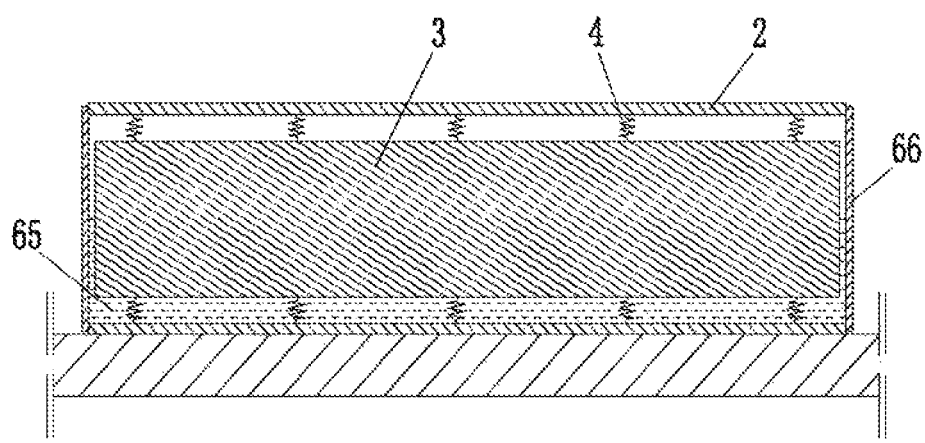
FIG. 21 is a cross-sectional view taken along C-C of FIG. 20.

The rail vibration absorber of the invention shown in FIGS. 20 and 21 is different from that shown in FIG. 4 in that the coupling frame 2 is made of steel plate, and in that the vibration absorption cavity 100 of the coupling frame has a damping element 65 disposed therein. The damping element 65 is made of liquid damping material. Seals 66 are disposed at the openings at both sides of the vibration absorption cavity 100. The seals 66 are made of steel plate. The seals 66 are soldered to the coupling frame, and thus enclose the vibration absorption cavity 100 completely. The liquid damping material fills a portion of the gap between the mass block 3 and walls of the vibration absorption cavity 100.

An applying method of the rail vibration absorber in this embodiment is the same as that in the first embodiment, and thus is not repeated. Compared with the rail vibration absorber shown in FIG. 4, when the mass block 3 displaces as it absorbs vibration energy from the steel rail, the liquid damping material will produce a reactive force to prevent the mass block from displacing so that energy from the mass block is dissipated quickly, since the damping element 65 made of the liquid damping material is added in the vibration absorption cavity. Thus, not only vibration energy from the steel rail is dissipated quickly, but also resonance of the elastic element(s) 4 is/are suppressed so that the elastic element(s) 4 can restore still, which can improve fatigue life of the elastic element(s), and hence prolong service life of the absorber of the invention.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Eighteenth Embodiment

Figure 22:
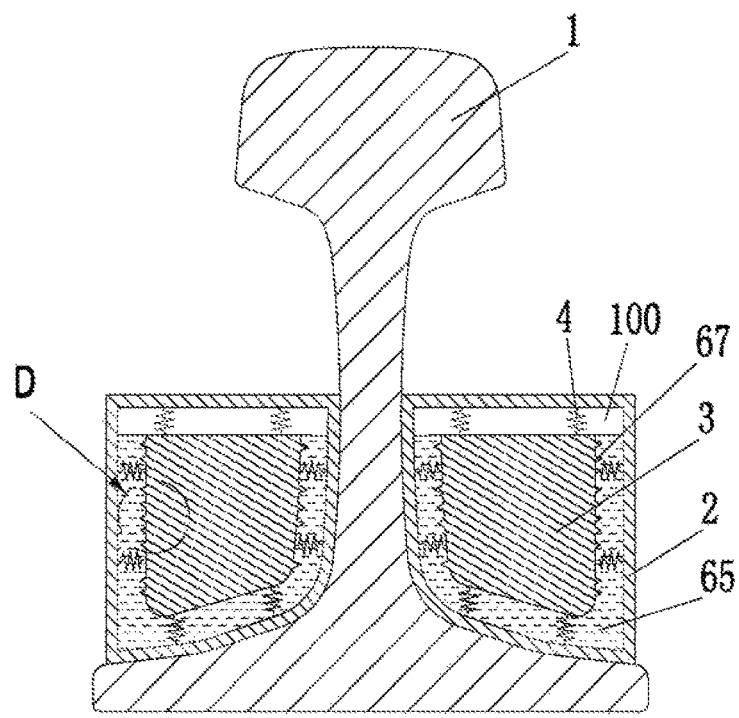
FIG. 22 is a structure schematic view and application schematic view of an eighteenth embodiment of the rail vibration absorber of the invention.
Figure 23:
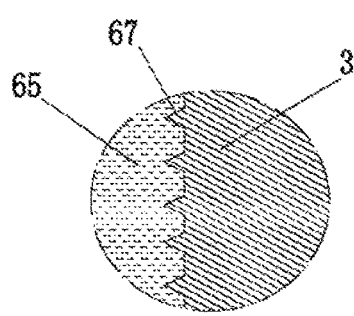
FIG. 23 is an enlarged view of portion D in FIG. 22.

The rail vibration absorber of the invention shown in FIGS. 22 and 23 is different from that in the seventeenth embodiment in that the mass block 3 has a flow-disturbing concave-convex structure disposed thereon. Specifically, the flow-disturbing concave-convex structure is a plurality of ridges 67 having a triangular cross-section disposed on surfaces of the mass block 3.

Compared with the seventeenth embodiment, the damping element 65 consisting of the mass block 3 and the liquid damping material has a larger effective contact area, and thus a drag force produced by the liquid damping material to the mass block is larger due to the plurality of ridges 67 disposed on the surfaces of the mass block 3, which can dissipate energy quickly, and provide better effect of vibration attenuating.

Figure 24:
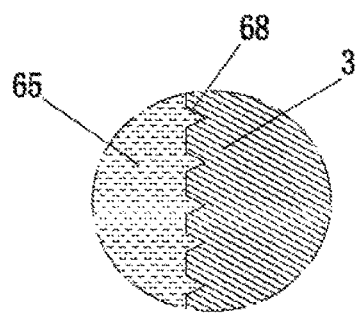
FIG. 24 is a structure schematic view and application schematic view of a nineteenth embodiment of the rail vibration absorber of the invention.
Figure 25:
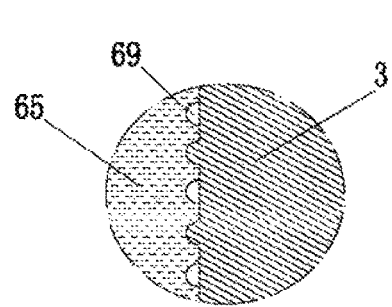
FIG. 25 is a structure schematic view and application schematic view of a twentieth view of the rail vibration absorber of the invention.
Figure 26:
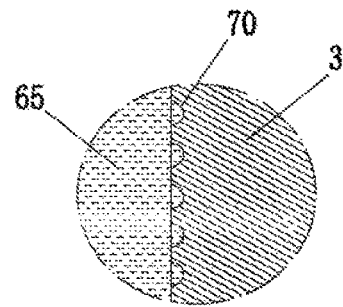
FIG. 26 is a structure schematic view and application schematic view of a twenty-first embodiment of the rail vibration absorber of the invention.

Based on above-mentioned technical principle in this embodiment, cross sections of the ridges 67 can be of various shapes, such as arc, rectangle, trapezoid, and so on. Furthermore, there can be a variety of flow-disturbing concave-convex structures. For example, the concave-convex structures can be a plurality of slots 68 in the surfaces of the mass block 3 shown in FIG. 24, or a plurality of local protrusions 69 on the surfaces of the mass block shown in FIG. 25, or a plurality of local recesses 70 in the surfaces of the mass block 3 shown in FIG. 26. Other than shapes illustrated, cross-sections of the slots 68, the local ridges 69 and the local recesses 70 can be various shapes as long as they increases effective contact area between the mass block and the liquid damping material, all of in which can obtain very good effect and are within the scope of the invention.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Nineteenth Embodiment

Figure 27:
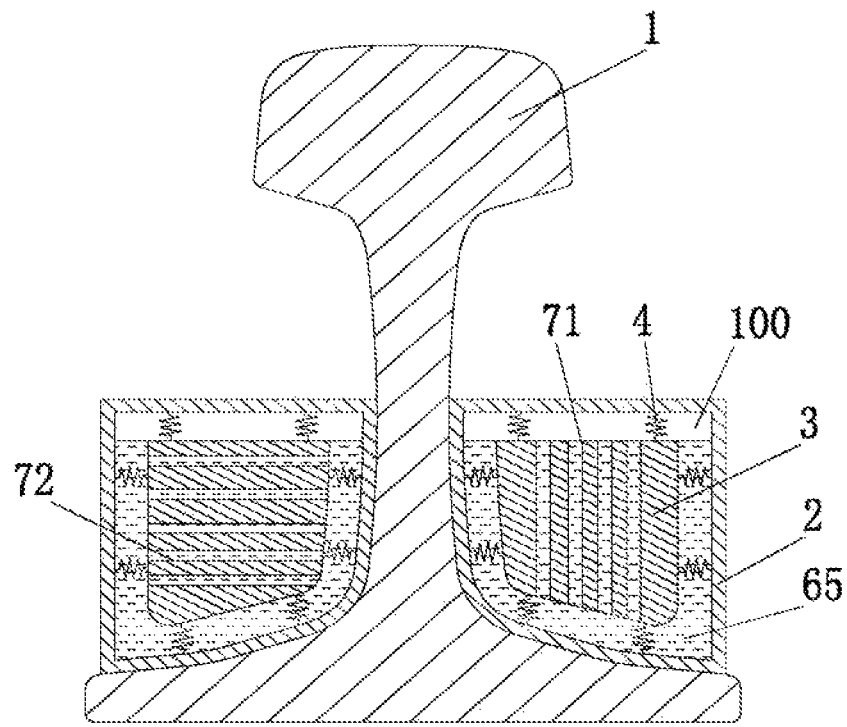
FIG. 27 is a structure schematic view and application schematic view of a twenty-second embodiment of the rail vibration absorber of the invention.

The rail vibration absorber of the invention shown in FIG. 27 is different from that in the eighteenth embodiment in that the flow-disturbing concave-convex structure consists of a plurality of flow-disturbing holes 71 running through the mass block 3 in vertical direction of the steel rail. The flow-disturbing holes 71 are immersed in the damping element 65 that is made of liquid damping material.

The flow-disturbing holes 71 disposed in the mass block 3 can effectively increase valid contact area between the mass block and the liquid damping material. When the mass block 3 is moving, the liquid damping material in the flow-disturbing holes 71 moves relative to the mass block 3. Accordingly, a resistive force is produced to dissipate energy. Therefore, having the flow-disturbing holes 71 disposed in the mass block 3 can effectively improve vibration reducing performance of the absorber. Since the flow-disturbing holes 71 are disposed in the vertical direction of the steel rail, the vibration reducing effect is most significant when the mass block moves in the vertical direction of the steel rail. Thus, this technical solution is more suitable for control of vertical vibration of the steel rail. Based on this principle, it is also possible to dispose the flow-disturbing holes 72 in the mass block in the transverse direction of the steel rail to control transverse vibration of the steel rail, as shown in FIG. 27. Surely, it is possible to have the flow-disturbing holes in the mass block in both of the vertical direction and transverse direction of the steel rail, which is advantageous for fully improving capacity of control of vibration of the steel rail, and is within the scope of the invention.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Twentieth Embodiment

Figure 28:
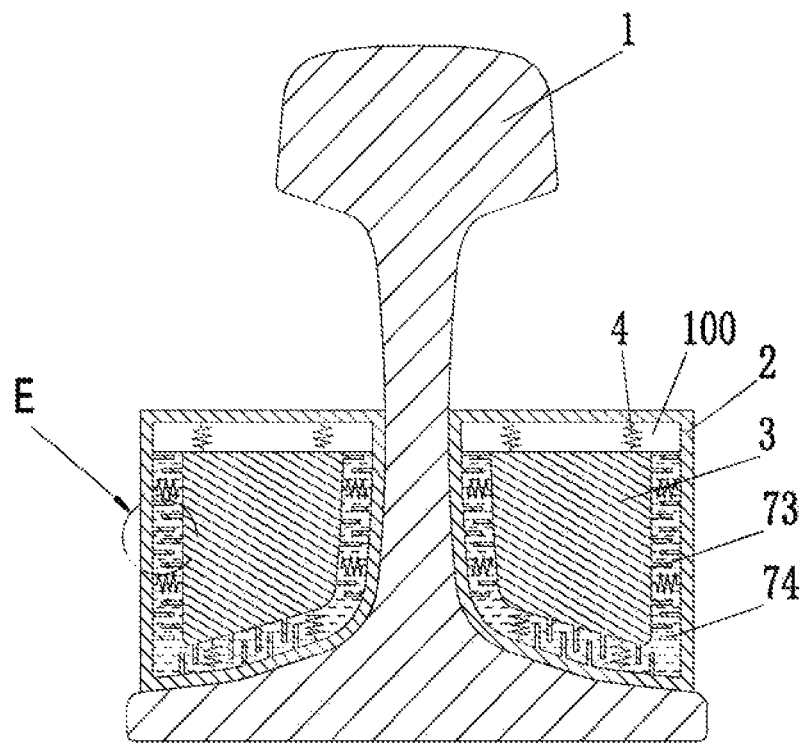
FIG. 28 is a structure schematic view and application schematic view of a twenty-third embodiment of the rail vibration absorber of the invention.
Figure 29:
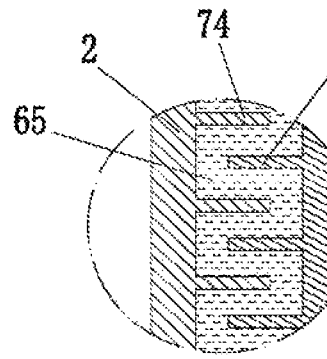
FIG. 29 is an enlarged view of portion E in FIG. 28.

The rail vibration absorber of the invention shown in FIGS. 28 and 29 is different from that in the sixteenth embodiment in that movable blades 73 are disposed on the mass block 3, and stationary blades disposed on the walls of the vibration absorption cavity 100 to cooperate with the movable blades 73 alternately, and a portion of gaps between adjacent static stationary blade 74 and a movable blade 73 are filled with the liquid damping material 65.

Similar to a technical solution in the eighteenth embodiment, valid contact area between the mass block and the liquid damping material is substantially increased due to cooperating of the movable and stationary blades disposed on the mass block and the walls of the vibration absorption cavity while extruding effects are imparted to the liquid damping material by the movable and stationary blades cooperating with each other during operating, which can dissipate energy quickly and provide better vibration reducing effect.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Twenty-first Embodiment

Figure 30:
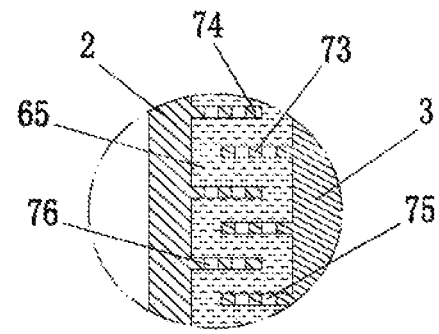
FIG. 30 is a structure schematic view and application schematic view of a twenty-fourth embodiment of the rail vibration absorber of the invention.

The rail vibration absorber of the invention shown in FIG. 30 is different from that in the twentieth embodiment in that flow-disturbing holes 75 and 76 are disposed in the movable and stationary blades 73 and 74, respectively.

Since the flow-disturbing holes are disposed in both the movable and the stationary blades, the liquid damping material is forced to move in the flow-disturbing holes when the movable blades are approaching to the static blades, which further improves energy dissipating capacity and hence vibration reducing performance of the absorber. Based on above-mentioned technical principle in this embodiment, the flow-disturbing holes can be disposed only in movable blades or only in stationary blades, which can also provide good vibration reducing effect. Furthermore, based on the technical principles in this embodiment and the eighteenth embodiment, it is also possible to further dispose the flow-disturbing concave-convex structures, such as ridges, protrusions, local protrusions or local recesses, on the stationary blades and/or movable blades, all of which can provide similar effect, are within the scope of the invention, and are described in text only without being illustrated in additional drawings.

The elastic element(s) in this embodiment can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The Twenty-second Embodiment

Figure 31:
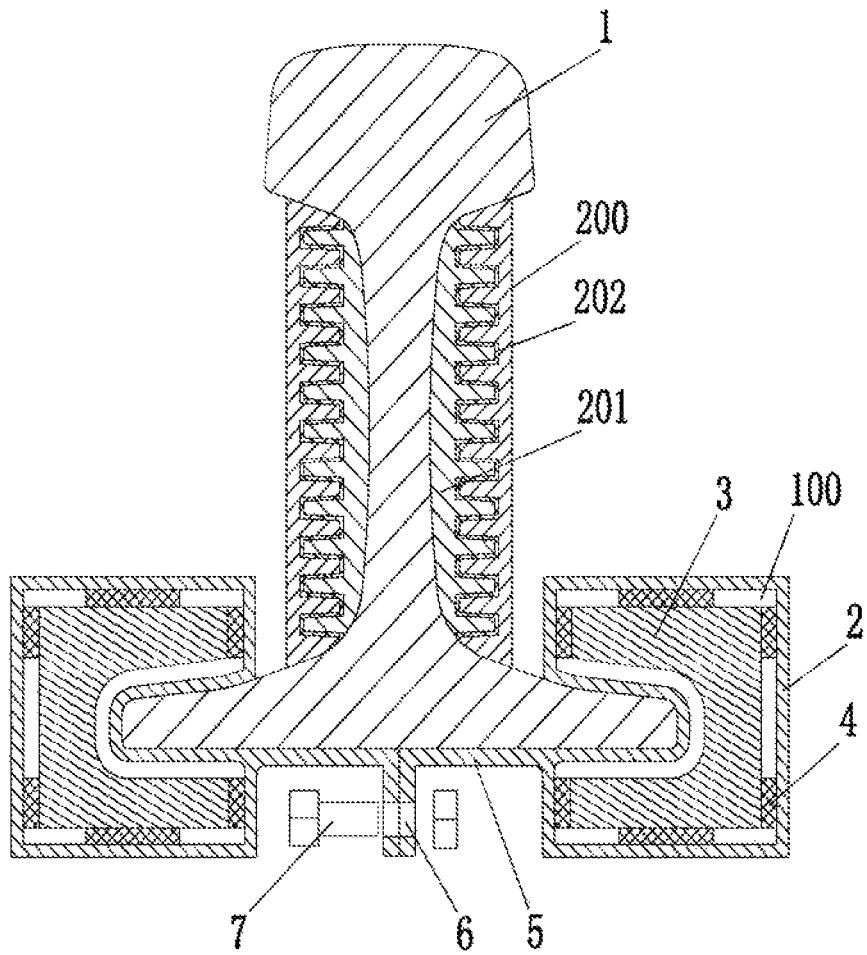
FIG. 31 is a structure schematic view and application schematic view of a twenty-fifth embodiment of the rail vibration absorber of the invention.

The rail vibration absorber of the invention shown in FIG. 31 is different from that in the fifth embodiment in that the coupling frame 2 encloses a portion of a wing plate and a portion of the bottom of the steel rail 1, and comprises a vibration absorption cavity 100, correspondingly, the mass block 3 is in shape of 'C', the elastic element(s) 4 is/are disposed between the mass block 3 and the vibration absorption cavity 100 in the vertical direction and the transverse direction of the steel rail, wherein the elastic element(s) 4 is/are affixed to the mass block 3 and the coupling frame 2 by vulcanization process, is pre-compressed and under pre-compressed condition when it is assembled with the mass block 3 and the coupling frame 2, and displacement of the elastic element 4 caused by pre-compression is larger than a vibration amplitude of the mass block 3 relative to the walls of the vibration absorption cavity 100 when the mass block 3 is in use.

A method for assembling of the rail vibration absorber and the steel rail in this embodiment is the same as the method in the fifth embodiment, and thus is not repeated. Compared with the fifth embodiment, the rail vibration absorber in this embodiment is assembled with the steel rail at a lower position, which can provide more space for accessories for the steel rail such as fishplate, and improve adaptability of border of the steel rail. Furthermore, as shown in FIG. 31, the rail vibration absorber in this embodiment of the invention can cooperate with maze-constraining damping plates in uses. The maze-constraining damping plates comprise a connection plate 201 and a constraining plate 200. The connection plate 201 and the constraining plate 202 both have concave-convex structures that cooperate with each other. A damping material layer 202 is disposed in gap between the connection plate 201 and the constraining plate 200. Since the maze-constraining damping plate has wide range vibration and noise reducing effect, when the maze-constraining damping plate is used together with the rail vibration absorber, the rail vibration absorber can be used to control vibration under certain frequencies that contribute significantly to vibration and noise, and the maze-constraining damping plate can be used to suppress vibration and noise in a wide range of frequencies efficiently, which can provide more excellent overall management of vibration and noise of the steel rail. Based on above-mentioned technical principle in this embodiment, solutions in other embodiments can cooperate with the maze-constraining damping plate as well in uses as desired. For example, the maze-constraining damping plate can be additionally disposed at the rail web and above the rail vibration absorber in applications of the rail vibration absorber shown in FIG. 28, or can be additionally disposed at the bottom of the rail shown in applications of the rail vibration absorber shown in FIG. 22, both of which can provide very good vibration and noise reducing effect, and are described in text only without being illustrated in additional drawings. It needs to be explained that in this embodiment, the elastic element(s) can be or not be pre-compressed as desired. Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

It is obvious from the aforementioned embodiments that the rail vibration absorber of the invention has the mass-spring system consisting of the mass block and the elastic element(s) disposed within the coupling frame. It has at least the following advantages. (1) The coupling frame provides effective protection for the mass-spring system consisting of the mass block and the elastic element(s). In particular, when high polymer elastic material is used, the elastic material is not susceptible to aging so that service life of its products is substantially prolonged. (2) Since that the mass block of the present invention is not enclosed within the elastic elements, unlike that of the prior arts, and that the mass block of the present invention only connects with the elastic elements in series, materials of the elastic elements can be selected from a wider range, and makes use of metallic spring possible, which can take full advantage of high elasticity, stable physical properties influenced little by environments, such as humidity and so on, more efficient and stable vibration attenuating performance and long service life. (3) In addition to tuned mass damping, the mass block and the coupling frame constrain the elastic element(s) and damping element(s) when amplitudes of vibration of the mass block and the coupling frame are larger than ½ wavelength of a modal frequency, and relative deformation between the mass block and the coupling frame will shear the damping material therebetween, realizing an additional energy dissipating caused by shear deformation, and hence a more significant vibration reducing effect. (4) The rail vibration absorber of the invention makes a breakthrough in structure and applies fewer constraints to the elastic elements. Thus, materials of the elastic elements can be chosen from a wider range. For low-frequency and high-frequency, rubber can be replaced by elastic elements such as the metallic springs in order to avoid drawbacks of existing kind of rubber elastic elements, such as temperature sensitivity. Thus, the rail vibration absorber is applicable to a wider parameter range, has more stable performance and better weatherability. (5) Since that space available on surface of the steel rail is very limited, and that the mass block of the present invention are not disposed within the elastic element(s), the elastic element(s) requires less space, and thus a larger and heavier mass block can be disposed under same space condition, which in turn effectively improves turned mass vibration reducing effect. (6) The elastic elements, the damping material, and the adhesive material can be optimized individually, and each can be produced in large scale in factories, resulting in stable parameters, wherein the adhesive material provides adhesion strength, the elastic material provides frequency tuning, and the damping material provides energy dissipating. (7) Even in case of breaking of the elastic material, the mass block of the rail vibration absorber would not fall off, which provides safety and reliability. (8) The elastic elements are disposed to the left and the right of the mass block, and above and under the mass block separately. Therefore the same mass block can be independently adjusted in the vertical and transverse directions of the steel rail to realize tuned mass vibration reducing in the both directions. (9) The rail vibration absorber is a finished product when leaving factories. Working frequency of the product can be accurately measured and tuned before leaving factories. Thus, no tuning on field is required. Only bonding, clipping or connecting by fasteners is needed. (10) If the elastic elements are pre-compressed, rigidity of the elastic elements and working frequency of the vibration absorber would not change, even if the material breaks or internal cracks are formed. On the other hand, when in use of control of high-frequency vibration, since vibration amplitude of the mass block is less, rigidity of the elastic elements pre-compressed changes linearly, which renders easier design and more accurate control. Thirdly, in case of breaking of the elastic material, since the elastic elements are pre-tightened, the mass block would not fall off, which provides safety and reliability.

The elastic element(s) in the invention can be or not be pre-compressed wherein when the elastic element(s) is/are not pre-compressed, it is necessary to consider positioning and fixing of the elastic element(s). Generally speaking, it is required to pre-tighten the elastic elements in controlling of high-frequency vibrations, and it is not required to pre-tighten the elastic elements in controlling of low-frequency vibrations. In practical applications, it is possible to select whether or not to pre-tighten the elastic elements depending on characteristics of the vibration frequencies of the structure that needs to be controlled.

The rail vibration absorber of the invention has versatile adaptability, long service life, good weatherability, excellent vibration and noise reducing effect, and very wide prospect of applications. Furthermore, embodiments in the invention are only for illustrative purpose, and should not be interpreted as limiting. Technical features in many embodiments can be interchanged in uses. Moreover, assembling methods of the invention and the steel rails are not exhaustive. In addition to bonding by adhesive material, connecting by snapping and connecting by fasteners mentioned in the embodiments, other means, such as connecting by spring clips can be used in assembling thereof. It should be understood by those skilled in the art that various modifications, combinations, sub-combinations and alterations may be made based on the technical principles of the invention, which are all within the scope of the invention.

What is claimed is:

1. A rail vibration absorber, comprising an elastic element(s) and a mass block, wherein the rail vibration absorber further comprises at least one coupling frame, the coupling frame has same surface shape as a non-working surface coupling portion of a steel rail, the coupling frame includes at least one vibration absorption cavity in it, with the mass block at least partially disposed in the vibration absorption cavity of the coupling frame, and the elastic element(s) is/are arranged between the mass block and a wall of the vibration absorption cavity, wherein, in a sectional view of the rail vibration absorber, the coupling frame has a first portion and a second portion opposite to each other, and in a straight-line direction passing through the first portion and the second portion, the elastic element(s) is/are located between the mass block and at least one of the first portion or the second portion of the coupling frame.

2. The rail vibration absorber according to claim 1, wherein the elastic element(s) is/are arranged between the mass block and the wall of the vibration absorption cavity in a vertical direction and/or a transverse direction of the steel rail, or the elastic element(s) surround(s) the mass block between the mass block and the wall of the vibration absorption cavity.

3. The rail vibration absorber according to claim 1, wherein the elastic element(s) is/are made of at least one material selecting from a group consisting of rubber, elastic polyurethane and metallic spring, the metallic spring includes disk spring, plate spring and coil spring.

4. The rail vibration absorber according to claim 3, wherein the elastic element(s) is/are integrally connected with the mass block and the wall of the vibration absorption cavity respectively by bonding with adhesive material, soldering or vulcanizing.

5. The rail vibration absorber according to claim 1, wherein a displacement of the elastic element(s) caused by pre-compression is larger than a vibration amplitude of the mass block during it works relative to the wall of the vibration absorption cavity when the elastic element(s) arranged between the mass block and the wall of the vibration absorption cavity is under pre-compressed condition.

6. The rail vibration absorber according to claim 1, wherein a connection plate is disposed on the coupling frame, and a connecting hole, a bent connecting portion or a snapping structure is disposed on a connection plate.

7. The rail vibration absorber according to claim 1, wherein a connection reinforcement structure is disposed on a wall surface of the vibration absorption cavity cooperating with the elastic element(s) and/or a mating surface of the mass block cooperating with the elastic element(s), and wherein the connection reinforcement structure comprises a surface concave-convex structure, a surface knurling structure or a surface galling structure.

8. The rail vibration absorber according to claim 1, wherein the coupling frame is disposed on the non-working surface of the steel rail along a longitudinal direction of the steel rail, and wherein the non-working surface of the steel rail includes surface of a lower portion of a railhead, surface of a rail web, surface of a wing plate, and bottom surface of the steel rail outside border of the steel rail when the steel rail is in use.

9. The rail vibration absorber according to claim 1, wherein more than one vibration absorption cavities are disposed in the coupling frame side-by-side in the vertical direction of the steel rail, and/or in the transverse direction of the steel rail, and/or along the longitudinal direction of the steel rail.

10. The rail vibration absorber according to claim 1, wherein the coupling frame has a closed shape in a cross section of the rail vibration absorber.

11. A rail vibration absorber, comprising an elastic element and a mass block, wherein the rail vibration absorber further comprises at least one coupling frame, the coupling frame has the same surface shape as a non-working surface coupling portion of a steel rail, the coupling frame includes at least one vibration absorption cavity, with the mass block at least partially disposed in the vibration absorption cavity of the coupling frame, and the elastic element is arranged between the mass block and a wall of the vibration absorption cavity, the rail vibration absorber further comprising a damping element arranged between the mass block and the wall of the vibration absorption cavity, wherein the damping element comprises at least one of an elastic solid damping material or a liquid damping material, when the damping element is liquid, a seal is disposed at an opening of the vibration absorption cavity and seals completely the vibration absorption cavity, with the liquid damping material being filled in a portion of gap between the mass block and the wall of the vibration absorption cavity.

12. The rail vibration absorber according to claim 11, wherein movable blades are disposed on the mass block, and stationary blades are disposed on the wall of the vibration absorption cavity and cooperate alternately with the movable blades, and the liquid damping material is filled in a portion of gap between adjacent stationary blades and movable blades.

13. The rail vibration absorber according to claim 12, wherein flow-disturbing holes or flow-disturbing concave-convex structures are disposed on the movable blades and/or stationary blades.

14. The rail vibration absorber according to claim 11, wherein flow-disturbing holes or flow-disturbing concave-convex structures are disposed on the mass block.

* * * * *